US008710773B2

(12) United States Patent
Kigoshi et al.

(10) Patent No.: US 8,710,773 B2

(45) Date of Patent: Apr. 29, 2014

(54) VEHICLE WINDOW OPENING AND CLOSING CONTROL DEVICE

(75) Inventors: Katsunori Kigoshi, Kasugai (JP); Takashi Katoh, Nagoya (JP); Yoichi Atsumi, Kasugai (JP)

(73) Assignee: Omron Automotive Electronics Co., Ltd., Aichi (JP)

(*) Notice: Subject to any disclaimer, the term of this patent is extended or adjusted under 35 U.S.C. 154(b) by 322 days.

(21) Appl. No.: 13/273,342

(22) Filed: Oct. 14, 2011

(65) Prior Publication Data

US 2012/0091793 A1 Apr. 19, 2012

(30) Foreign Application Priority Data

Oct. 14, 2010 (JP) ................................ 2010-231306

(51) Int. Cl.

*H02P 1/00* (2006.01)

*E05F 15/16* (2006.01)

(52) U.S. Cl.

CPC .................................. *E05F 15/1684* (2013.01)

USPC ........... 318/280; 318/281; 318/282; 318/283; 318/284

(58) Field of Classification Search

CPC .................................................. E05F 15/1684

USPC ................................................. 318/280–284

See application file for complete search history.

(56) References Cited

U.S. PATENT DOCUMENTS

| | | | | |
|---|---|---|---|---|
| 5,121,038 | A | 6/1992 | Yamamura et al. | |
| 5,640,072 | A * | 6/1997 | Miyazaki et al. | 318/282 |
| 6,278,250 | B1 | 8/2001 | Sasaki | |
| 2005/0052082 | A1 | 3/2005 | Noro et al. | |

FOREIGN PATENT DOCUMENTS

| | | | |
|---|---|---|---|
| EP | 1033464 | A2 | 9/2000 |
| JP | 8-4417 | A | 1/1996 |
| JP | 08-189253 | A | 7/1996 |
| JP | 2000-352268 | A | 12/2000 |
| JP | 2005-083057 | A | 3/2005 |

OTHER PUBLICATIONS

Patent Abstracts of Japan, Publication No. 08-004417, dated Jan. 9, 1996, 1 page.

Office Action issued in Chinese Application No. 201110309986.7 mailed on Dec. 24, 2013 (17 pages).

* cited by examiner

*Primary Examiner* — Bentsu Ro

*Assistant Examiner* — David Luo

(74) *Attorney, Agent, or Firm* — Osha Liang LLP

(57) ABSTRACT

The driver seat unit and the other-seat unit are connected by the single signal line. A direction of a current passed through a motor is switched using contacts of a window opening switch and a window closing switch in the other-seat unit. When a window closing manipulation is performed by the driver seat unit, the current is passed through a coil of a relay via the contacts of the window closing switch, and a contact of the relay is switched to pass a forward current through the motor. When a window opening manipulation is performed by the driver seat unit, the current is passed through a coil of a relay via the contacts of the window opening switch, and a contact of the relay is switched to pass a reverse current through the motor.

9 Claims, 15 Drawing Sheets

DRIVER SEAT:
NO MANIPULATION
OTHER-SEAT UNIT:
DOWN MANIPULATION

DRIVER SEAT:
DOWN MANIPULATION
OTHER-SEAT UNIT:
DOWN MANIPULATION

UP OUTPUT

DOWN OUTPUT

RELAY 22A

RELAY 22B

VEHICLE WINDOW OPENING AND CLOSING CONTROL DEVICE

TECHNICAL FIELD

The present invention relates to a control device that opens and closes a window of a vehicle, particularly to a window opening and closing control device in which a control unit on a driver seat side and a control unit on an other-seat side are connected by a single signal line.

RELATED ART

In a power window device that opens and closes the window of the vehicle using an electric motor, a motor is normally or reversely rotated to open and close the window according to a manipulation status of a manipulation switch. For example, the motor is normally driven to close the window when the manipulation switch is manipulated onto an UP side (window closing side), and the motor is reversely driven to open the window when the manipulation switch is manipulated onto a DOWN side (window opening side). The normal rotation and the reverse rotation of the motor are controlled by switching a direction of a current passed through the motor in a motor driving circuit based on the signal from the manipulation switch.

Generally, in an automobile, the manipulation switches are provided in a driver seat and other seats (such as a passenger seat, a left rear seat, and a right rear seat), respectively. The manipulation switch provided in the driver seat includes other-seat switches that remotely manipulate to open and close the windows of other seats such as the passenger seat in addition to a driver seat switch that manipulates to open and close the window of the driver seat. Therefore, it is necessary to electrically connect the control unit (driver seat unit) on the driver seat side and the control unit (other-seat unit) on an other-seat side. In this case, when the motor current is directly cut off by a contact of the switch on the driver seat side, unfortunately it is necessary that the driver seat unit and the other-seat unit be connected by a thick wire for the large current, and the number of lines is also increased.

Therefore, for example, Japanese Unexamined Patent Publication No. 8-4417 discloses a window opening and closing control device in which the driver seat unit and the other-seat unit are connected by a single signal line. In the device of Japanese Unexamined Patent Publication No. 8-4417, a current-direction detection circuit that detects a current-passing direction of the signal line is provided in the other-seat unit. The current-direction detection circuit includes a photo coupler, and a light emitting diode (LED) of the photo coupler is connected to the driver seat unit via a signal line. The current-direction detection circuit detects the direction of the current passed through the signal line, thereby normally or reversely rotating the motor according to the current direction.

According to the window opening and closing control device of Japanese Unexamined Patent Publication No. 8-4417, it is only necessary to connect the driver seat unit and the other-seat unit by the single signal line. Therefore, the necessity of the thick wire for the large current is eliminated between the driver seat unit and the other-seat unit, and the number of lines can also be decreased.

Japanese Unexamined Patent Publication No. 8-4417

SUMMARY

The present invention has been devised to solve the problems described above, and an object thereof is to make a window opening and closing control device in which the control is performed from the driver seat unit to the other-seat unit via the single signal line by means different from that of Japanese Unexamined Patent Publication No. 8-4417.

In accordance with one aspect of the invention, a vehicle window opening and closing control device includes: a driver seat unit that controls opening and closing of a window based on a manipulation of a switch provided in a driver seat of a vehicle; and an other-seat unit that controls the opening and closing of the window based on a manipulation of a switch provided in any other seat except the driver seat. The driver seat unit includes a driver seat switch that opens and closes the window of the driver seat and an other-seat switch that opens and closes the window of any other seat, and the other-seat unit includes a switch that opens and closes the window of the any other seat. The driver seat unit and the other-seat unit are connected by a single signal line. The other-seat unit includes a first relay and a second relay, which switch a direction of a current passed through a window opening and closing motor. The switch of the other-seat unit includes a window opening switch that is manipulated in opening the window and a window closing switch that is manipulated in closing the window.

In the above window opening and closing control device, when the window closing switch is manipulated by the other-seat unit, the current is passed through a coil of the second relay from the power supply via the window closing switch, and a forward current is passed through the motor to normally rotate the motor by switching a contact of the second relay. When the window opening switch is manipulated by the other-seat unit, the current is passed through a coil of the first relay from the power supply via the window opening switch, and a reverse current is passed through the motor to reversely rotate the motor by switching a contact of the first relay. When the other-seat switch is manipulated onto a window closing side by the driver seat unit, the current is passed through a route to the coil of the second relay from the power supply via the driver seat unit, the signal line, and the window closing switch and the forward current is passed through the motor to normally rotate the motor by switching the contact of the second relay. When the other-seat switch is manipulated onto a window opening side by the driver seat unit, the current is passed through a route to the driver seat unit from the power supply via the window opening switch, the coil of the first relay, and the signal line and the reverse current is passed through the motor to reversely rotate the motor by switching the contact of the first relay.

Therefore, because the driver seat unit and the other-seat unit are connected by the single signal line, the necessity of the thick wire for the large current is eliminated between the driver seat unit and the other-seat unit, and the number of lines can also be decreased. The direction of the current passed through the motor can be switched using the contacts of the window opening switch and the window closing switch.

In the vehicle window opening and closing control device, preferably, when the other-seat switch is manipulated onto the window closing side by the driver seat unit while the window closing switch is manipulated by the other-seat unit, the current-passing route to the coil of the second relay from the driver seat unit via the signal line is cut off by the window closing switch. Then the current is passed through the coil of the second relay from the power supply via the window closing switch, and the forward current is passed through the motor to normally rotate the motor by switching the contact of the second relay.

Therefore, the motor is normally rotated to normally close the window, even if the manipulations to close the other-seat window are simultaneously performed on the driver seat side and the other-seat side.

In the vehicle window opening and closing control device, preferably, when the other-seat switch is manipulated onto the window opening side by the driver seat unit while the window opening switch is manipulated by the other-seat unit, the current-passing route to the driver seat unit from the power supply via the signal line is cut off by the window opening switch. Then the current is passed through the coil of the first relay from the power supply via the window opening switch, and the reverse current is passed through the motor to reversely rotate the motor by switching the contact of the first relay.

Therefore, the motor is reversely rotated to normally open the window, even if the manipulations to open the other-seat window are simultaneously performed on the driver seat side and the other-seat side.

In the vehicle window opening and closing control device, preferably, when the other-seat switch is manipulated onto the window opening side by the driver seat unit while the window closing switch is manipulated by the other-seat unit, the current is passed through a route to the driver seat unit from the power supply via the window opening switch, the coil of the first relay, and the signal line to switch the contact of the first relay. Further, the current is passed through the coil of the second relay from the power supply via the window closing switch to switch the contact of the second relay. Both ends of the motor are maintained at an identical potential by switching each contact such that the motor is not rotated.

Therefore, the rotation of the motor is prohibited to prevent a malfunction, when the manipulations contradictory to each other are simultaneously performed, namely, when the manipulation is performed to open the other-seat window on the driver seat side while the manipulation is performed to close the other-seat window on the other-seat side.

Similarly, in the vehicle window opening and closing control device, preferably, when the other-seat switch is manipulated onto the window closing side by the driver seat unit while the window opening switch is manipulated by the other-seat unit, the current is passed through a route to the coil of the second relay from the power supply via the driver seat unit, the signal line, and the window closing switch to switch the contact of the second relay. Further, the current is passed through the coil of the first relay from the power supply via the window opening switch to switch the contact of the first relay. Both ends of the motor are maintained at an identical potential by switching each contact such that the motor is not rotated.

Therefore, the rotation of the motor is prohibited to prevent the malfunction, when the manipulations contradictory to each other are simultaneously performed, namely, when the manipulation is performed to close the other-seat window on the driver seat side while the manipulation is performed to open the other-seat window on the other-seat side.

In the vehicle window opening and closing control device, preferably the window opening switch includes a first contact that connects one end of the coil of the first relay to the power supply, a second contact that connects the signal line to one end of the coil of the first relay, and a third contact that connects the other end of the coil of the first relay to a ground, and the first contact, the second contact, and the third contact are switched in conjunction with one another by the manipulation of the window opening switch. The window closing switch includes a fourth contact that connects one end of the coil of the second relay to the ground, a fifth contact that connects the signal line to one end of the coil of the second relay, and a sixth contact that connects the other end of the coil of the second relay to the power supply, and the fourth contact, the fifth contact, and the sixth contact are switched in conjunction with one another by the manipulation of the window closing switch.

Therefore, the first contact to the third contact are simultaneously switched by the manipulation of the window opening switch, and the fourth contact to the sixth contact are simultaneously switched by the manipulation of the window closing switch. Accordingly, the direction of the current passed through the motor can be controlled by a simple configuration in which only two switches, each of which has three contacts, are provided.

In the vehicle window opening and closing control device, preferably the driver seat unit includes a CPU. The CPU outputs a pulse signal having a duration not lower than a recovery time of the first relay or the second relay after the manipulation of the other-seat switch is released, and turns off the first relay or the second relay based on the pulse signal.

Therefore, after the manipulation of the other-seat switch is released by the driver seat unit, the relay can securely be turned off without an influence of a hysteresis between an operating voltage and a recovery voltage of the relay. Accordingly, the malfunction, in which the motor is continuously rotated although the manipulation is released, can be prevented.

In the vehicle window opening and closing control device, preferably the driver seat unit includes a pull-up resistor that is provided between the signal line and the power supply, a pull-down resistor that is provided between the signal line and the ground, and a CPU. The CPU monitors a potential at the signal line and detects a short circuit onto a ground side of the signal line or a short circuit onto a power supply side based on a fluctuation of the potential.

Therefore, for example, the potential at the signal line is maintained at a half (intermediate potential) of the potential at the power supply voltage by the pull-up resistor and the pull-down resistor. Accordingly, a determination that the signal line is short-circuited onto the ground side is made when the potential at the signal line becomes zero, and a determination that the signal line is short-circuited onto the power supply side is made when the potential at the signal line becomes the power supply voltage. Even if the potential at the signal line fluctuates slightly in the normal state due to the switch manipulation at the other-seat unit, because the CPU does not detect the short circuit, a status in which a fail-safe function is carelessly performed to stop the motor can be avoided.

The vehicle window opening and closing control device further includes a power-supply relay that supplies and cuts off an electric power to the other-seat unit, and the driver seat unit may put the power-supply relay into an off state to cut off the supply of the electric power to the other-seat unit in response to an externally-input command signal.

Therefore, the driver seat unit has a function of controlling the power-supply relay. Accordingly, when the command signal is externally issued to the driver seat unit, the power-supply relay can be turned off in predetermined timing to prohibit the other-seat window to being opened and closed.

According to the invention, because the driver seat unit and the other-seat unit are connected by the single signal line, the necessity of the thick wire for the large current is eliminated between the driver seat unit and the other-seat unit, and the number of lines can also be decreased. The direction of the current passed through the motor can be switched using the contacts of the window opening switch and the window closing switch.

DETAILED DESCRIPTION

Hereinafter, preferred embodiments of the present invention will be described with reference to the drawings. In each drawing, an identical component or an equivalent component is designated by an identical numeral.

Figure 1:
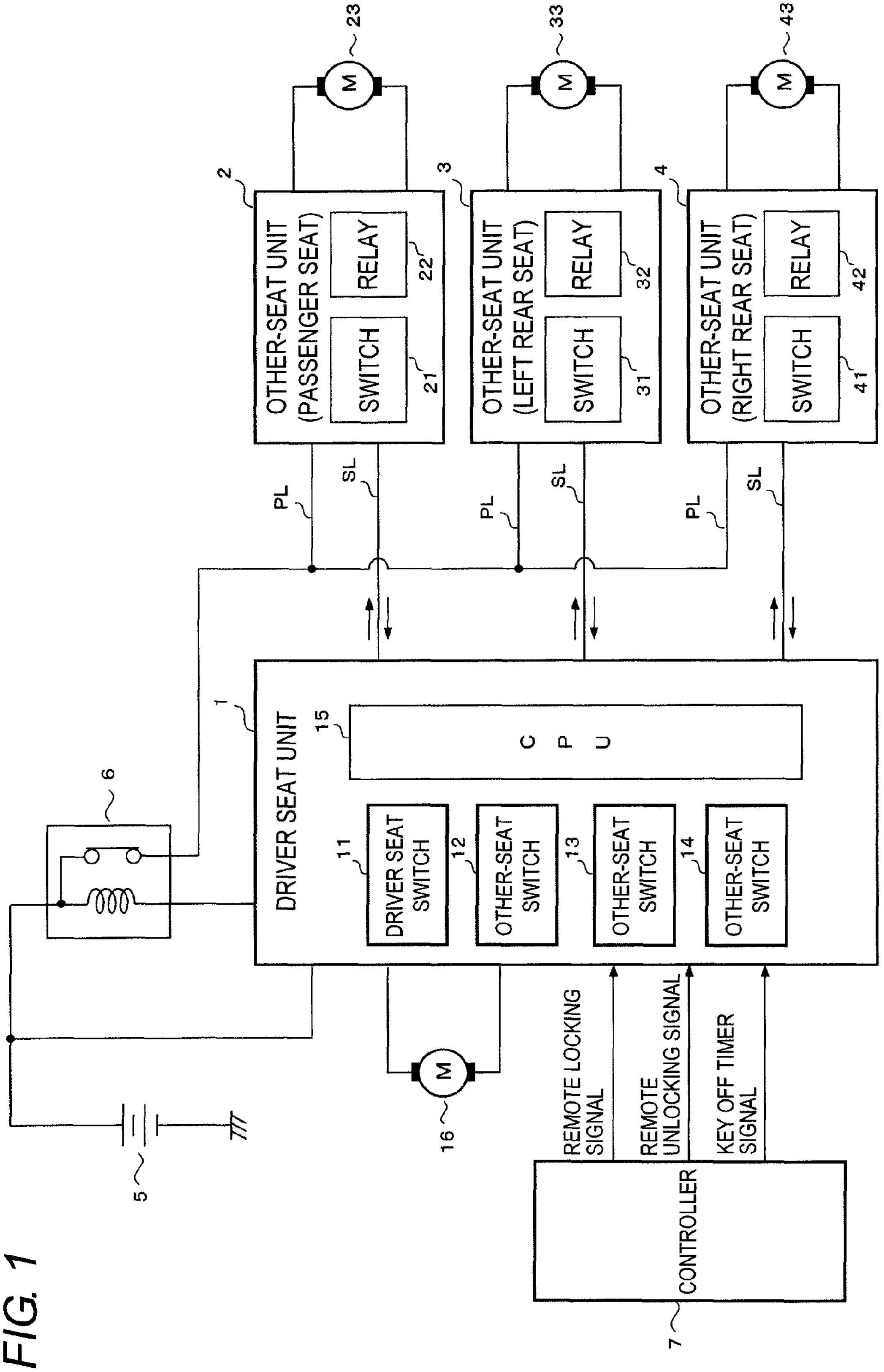
FIG. 1 is a configuration diagram of a system including a vehicle window opening and closing control device according to an embodiment of the invention.

A schematic configuration of a vehicle window opening and closing control device (hereinafter simply referred to as a "window opening and closing control device") will be described with reference to FIG. 1. Referring to FIG. 1, the window opening and closing control device includes a driver seat unit 1, other-seat units 2 to 4, and a power-supply relay 6. The configuration of FIG. 1 is common to the following embodiments.

The driver seat unit 1 is a control unit that controls the opening and closing of the window based on a manipulation of a switch provided in a driver seat of a vehicle. The driver seat unit 1 includes a driver seat switch 11 that opens and closes the window of the driver seat, other-seat switches 12 to 14 that open and close the windows of other seats except the driver seat, and a CPU 15 that is of a control portion. A motor 16 that opens and closes the window of the driver seat is driven by the manipulation of the driver seat switch 11. A specific configuration and a behavior of the driver seat unit 1 are described in detail later.

The other-seat units 2 to 4 are control units that control the opening and closing of the window based on the manipulations of the switches provided in other seats except the driver seat. The other-seat unit 2 is one that corresponds to the passenger seat, and the other-seat unit 2 includes a switch 21 that is provided in the passenger seat and a relay 22 that is controlled by the switch 21. A motor 23 that opens and closes the window of the passenger seat is driven via the relay 22 by the manipulation of the switch 21. The other-seat unit 2 is connected to the driver seat unit 1 by a single signal line SL. Therefore, the motor 23 is also driven by manipulating the other-seat switch 12 of the driver seat unit 1. A signal current is bi-directionally passed through the signal line SL as illustrated by an arrow of FIG. 1, and a direction of a current passed through the motor 23 is determined according to the direction of the signal current. A specific configuration and a behavior of the other-seat unit 2 are described in detail later.

The other-seat unit 3 is one that corresponds to the left rear seat, and the other-seat unit 3 includes a switch 31 that is provided in the left rear seat and a relay 32 that is controlled by the switch 31. A motor 33 that opens and closes the window of the left rear seat is driven via the relay 32 by the manipulation of the switch 31. The other-seat unit 3 is connected to the driver seat unit 1 by a single signal line SL. Therefore, the motor 33 is also driven by manipulating the other-seat switch 13 of the driver seat unit 1. A signal current is bi-directionally passed through the signal line SL as illustrated by the arrow of FIG. 1, and a direction of a current passed through the motor 33 is determined according to the direction of the signal current.

The other-seat unit 4 is one that corresponds to the right rear seat, and the other-seat unit 4 includes a switch 41 that is provided in the right rear seat and a relay 42 that is controlled by the switch 41. A motor 43 that opens and closes the window of the right rear seat is driven via the relay 42 by the manipulation of the switch 41. The other-seat unit 4 is connected to the driver seat unit 1 by a single signal line SL. Therefore, the motor 43 is also driven by manipulating the other-seat switch 14 of the driver seat unit 1. A signal current is bi-directionally passed through the signal line SL as illustrated by an arrow of FIG. 1, and a direction of a current passed through the motor 43 is determined according to the direction of the signal current.

A power supply voltage (for example, 12 V) is supplied to the other-seat units 2 to 4 from a power supply 5 via the power-supply relay 6 and power-supply lines PL. The power supply voltage is also supplied to the driver seat unit 1 from the power supply 5 via another route.

A controller 7 transmits command signals such as a remote locking signal, a remote unlocking signal, and a key off timer signal to the driver seat unit 1. The remote locking signal is the command signal that locks a door of the vehicle, and the remote unlocking signal is the command signal that unlocks the door of the vehicle. The key off timer signal is the command signal that enables the window to be opened and closed until a given time elapses (for example, 10 minutes) after an ignition key of the vehicle is turned off and disables the window to be opened and closed when the given time elapses.

The controller 7 may be a remote control device that wirelessly transmits the command signal.

First Embodiment

Figure 2:
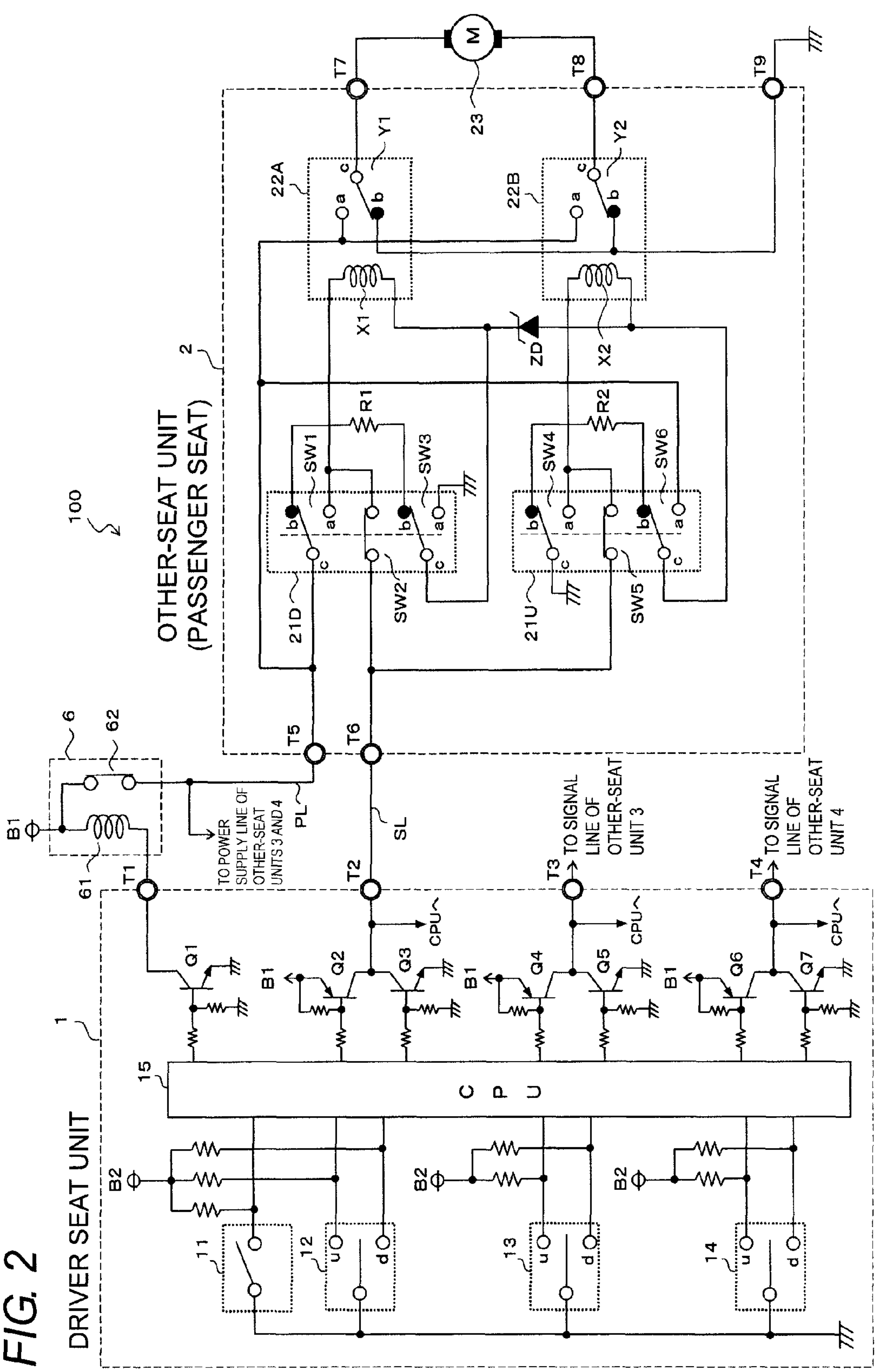
FIG. 2 is a circuit diagram illustrating a vehicle window opening and closing control device according to a first embodiment.

FIG. 2 illustrates a specific configuration of a window opening and closing control device 100 according to a first embodiment of the invention. The power supply 5, the controller 7, and the motor 16 of FIG. 1 are removed in FIG. 2. The configuration of the window opening and closing control device 100 will be described with reference to FIG. 2.

As described above, the driver seat unit 1 includes the driver seat switch 11, the other-seat switches 12 to 14, and the CPU 15. One end of the driver seat switch 11 is connected to a power supply B2 (for example, 5 V) via a resistor while connected to an input port of the CPU 15. The other end of the driver seat switch 11 is connected to the ground. One side of each of the other-seat switches 12 to 14 is connected to a power supply B2 via a resistor while connected to an input port of the CPU 15. The other side of each of the other-seat switches 12 to 14 is connected to the ground. Each of the other-seat switches 12 to 14 can switch between a u-side and a d-side, each of the other-seat switches 12 to 14 is switched to the u-side when the other-seat window is closed, and each of the other-seat switches 12 to 14 is switched to the d-side when the other-seat window is opened.

Bases of switching transistors Q1 to Q7 are connected to output ports of the CPU 15 via resistors. A collector of the transistor Q1 is connected to one end of a coil 61 of the power-supply relay 6 via a terminal T1. The other end of the coil 61 is connected to the power supply B1 (power supply 5 of FIG. 1). An emitter of the transistor Q1 is connected to the ground.

The emitter of the transistor Q2 is connected to the power supply B1, and the emitter of the transistor Q3 is connected to the ground. The collectors of the transistors Q2 and Q3 are commonly connected, and a connection point of the transistors Q2 and Q3 is connected to the signal line SL via a terminal T2. The signal line SL is connected to a terminal T6 of the other-seat unit 2.

The emitter of the transistor Q4 is connected to the power supply B1, and the emitter of the transistor Q5 is connected to the ground. The collectors of the transistors Q4 and Q5 are commonly connected, and a connection point of the transistors Q4 and Q5 is connected to the other-seat unit 3 via a terminal T3 and the signal line SL (see FIG. 1).

The emitter of the transistor Q6 is connected to the power supply B1, and the emitter of the transistor Q7 is connected to the ground. The collectors of the transistors Q6 and Q7 are commonly connected, and a connection point of the transistors Q6 and Q7 is connected to the other-seat unit 4 via a terminal T4 and the signal line SL (see FIG. 1).

Because the other-seat units 2 to 4 have the same configuration, only the configuration of the other-seat unit 2 is illustrated in FIG. 2, and the other-seat units 3 and 4 at the right and left rear seats are removed in FIG. 2.

In the other-seat unit 2, the switch 21 of FIG. 1 includes a window opening switch 21D that is manipulated to open the window and a window closing switch 21D that is manipulated to close the window. The relay 22 of FIG. 1 includes a relay 22A (first relay) and a relay 22B (second relay).

The window opening switch 21D includes a contact SW1 (first contact) that connects one end of a coil X1 of the relay 22A to the power supply B1, a contact SW2 (second contact) that connects the signal line SL to one end of the coil X1 of the relay 22A, and a contact SW3 (third contact) that connects the other end of the coil X1 of the relay 22A to the ground. The contact SW1 and the contact SW3 switch between an a-side (normally opened contact) and a b-side (normally closed contact), and the b-sides of the contact SW1 and the contact SW3 are connected via a resistor R1. The three contacts SW1 to SW3 are switched in conjunction with one another by the manipulation of the window opening switch 21D.

The window closing switch 21U includes a contact SW4 (fourth contact) that connects one end of a coil X2 of the relay 22B to the ground, a contact SW5 (fifth contact) that connects the signal line SL to one end of the coil X2 of the relay 22B, and a contact SW6 (sixth contact) that connects the other end of the coil X2 of the relay 22B to the power supply B1. The contact SW4 and the contact SW6 switch between the a-side (normally opened contact) and the b-side (normally closed contact), and the b-sides of the contact SW4 and the contact SW6 are connected via a resistor R2. The three contacts SW4 to SW6 are switched in conjunction with one another by the manipulation of the window closing switch 21U.

The relay 22A includes the coil X1 and a contact Y1. One end of the coil X1 is connected to the a-side of the contact SW1 of the window opening switch 21D while connected to the signal line SL via the contact SW2 and a terminal T6. The other end of the coil X1 is connected to a common terminal c of the contact SW3 while connected to a cathode of a constant voltage diode ZD. The contact Y1 switches between the a-side (normally opened contact) and the b-side (normally closed contact). The a-side of the contact Y1 is connected to a contact 62 of the power-supply relay 6 via a terminal T5 while connected to the a-side of the contact SW6. The b-side of the contact Y1 is connected to the ground via a terminal T9. The common terminal c of the contact Y1 is connected to a terminal T7. One end of the motor 23 is connected to the terminal T7.

The relay 22B includes the coil X2 and a contact Y2. One end of the coil X2 is connected to the a-side of the contact SW4 of the window closing switch 21U while connected to the signal line SL via the contact SW5 and the terminal T6. The other end of the coil X2 is connected to the common terminal c of the contact SW6 while connected to an anode of the constant voltage diode ZD. The contact Y2 switches between the a-side (normally opened contact) and the b-side (normally closed contact). The a-side of the contact Y2 and the a-side of the contact Y1 are commonly connected, and the b-side of the contact Y2 and the b-side of the contact Y1 are commonly connected. The common terminal c of the contact Y2 is connected to a terminal T8. The other end of the motor 23 is connected to the terminal T8.

An operation of the window opening and closing control device 100 having the above configuration will be described below. The circuit is in the state of FIG. 2 when the switches of the driver seat unit 1 and the other-seat unit 2 are not manipulated. In the state of FIG. 2, the relays 22A and 22B are not operated, but the contacts Y1 and Y2 of the relays 22A and 22B are switched onto the b-side. Therefore, the current is not passed through the motor 23, and the motor 23 is not rotated. (in the state of FIG. 2, the relays 22A and 22B are not operated although the currents are passed through the coils X1 and X2 of the relays 22A and 22B from the power supply B1, the detailed description is made later))

The operations in the case that the driver seat unit 1 and the other-seat unit 2 are manipulated will be described with reference to FIGS. 3 to 10. In FIGS. 3 to 10, only the other-seat unit 2 of the passenger seat is illustrated as the other-seat unit. The driver seat unit 1 is simplified and illustrated in a contact form. Referring to FIG. 2, when the contact is located on the u-side, the other-seat switch 12 of the driver seat unit 1 is switched onto the u-side (window closing side), the transistor Q2 is put into an on-state, the transistor Q3 is put into an off-state, the terminal T2 is connected to the power supply B1 to become an "H" (high) level. Referring to FIG. 2, when the contact is located on the d-side, the other-seat switch 12 of the driver seat unit 1 is switched onto the d-side (window opening side), the transistor Q2 is put into the off-state, the transistor Q3 is put into the on-state, the terminal T2 is connected to the ground to become an "L" (low) level. Hereinafter, the window closing manipulation is referred to as an "UP manipulation", and the window opening manipulation is referred to as a "DOWN manipulation".

Figure 3:
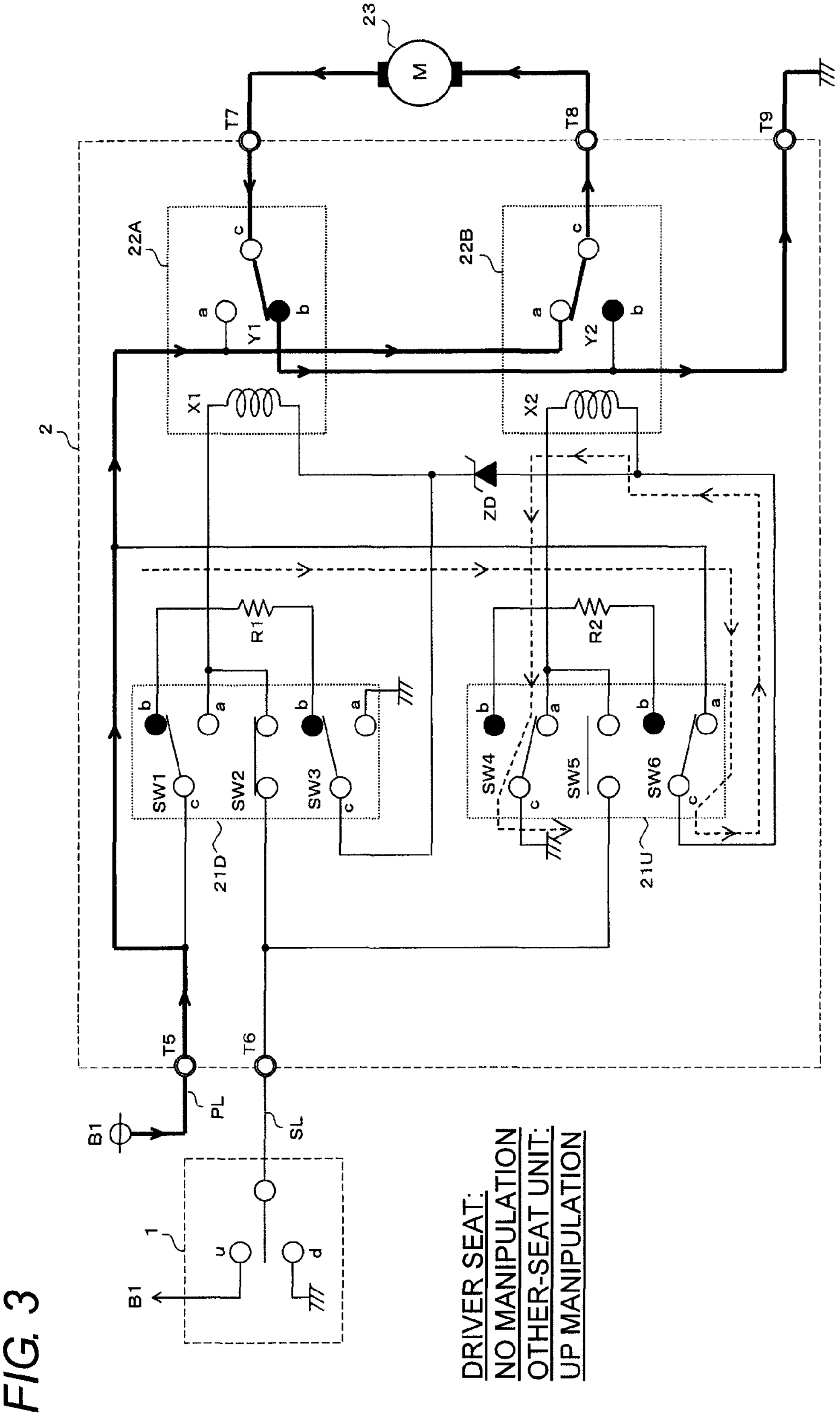
FIG. 3 is a circuit diagram illustrating a current-passing state when a window closing manipulation is performed at any other seat.

(1) The Case in which the Manipulation is not Performed at the Driver Seat while the UP Manipulation is Performed at any other Seat (FIG. 3)

In the other-seat unit 2, when the window closing switch 21U is manipulated to perform the UP manipulation, the contacts SW4 to SW6 of the window closing switch 21U are switched in conjunction with one another. The contact SW4 is switched onto the a-side, the contact SW5 is opened, and the contact SW6 is switched onto the a-side. Therefore, as illustrated by a broken-line arrow of FIG. 3, the current is passed through a route of contact SW6→coil X2 of relay 22B→contact SW4→ground from the power supply B1 via the terminal T5. As a result, the current is passed through the coil X2 to operate the relay 22B. Then, the contact Y2 of the relay 22B is switched onto the a-side, and the current is passed through a route of contact Y2→motor 23→contact Y1→terminal T9→ground from the power supply B1 via the terminal T5 as illustrated by a solid-line arrow of FIG. 3. At this point, it is assumed that a direction of the current passed through the motor 23 is a "forward direction". The current is passed through the motor 23 in the forward direction to normally rotate the motor 23, thereby closing the window.

Figure 4:
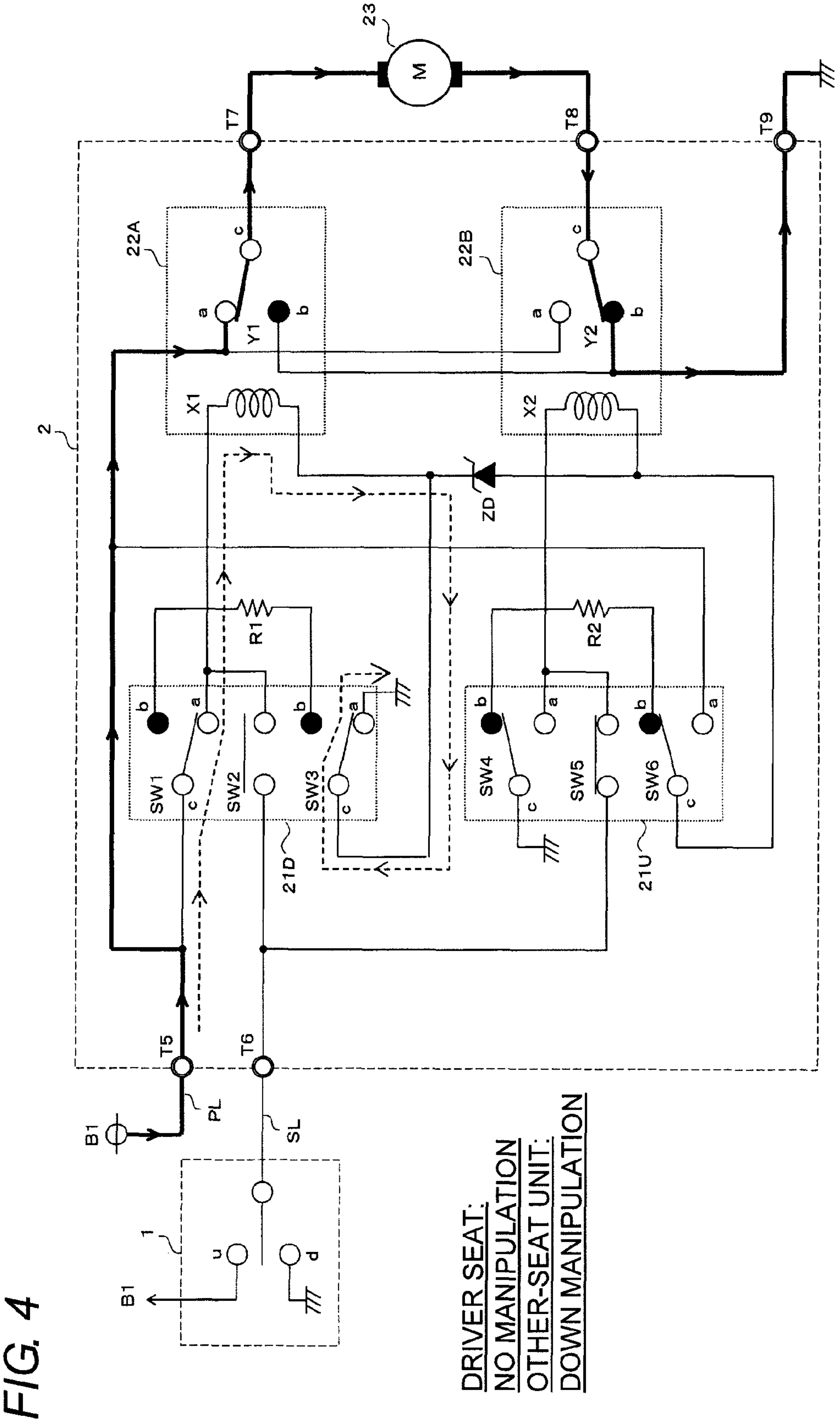
FIG. 4 is a circuit diagram illustrating the current-passing state when a window opening manipulation is performed at any other seat.

(2) The Case in which the Manipulation is not Performed at the Driver Seat while the DOWN Manipulation is Performed at any other Seat (FIG. 4)

In the other-seat unit 2, when the window opening switch 21D is manipulated to perform the DOWN manipulation, the contacts SW1 to SW3 of the window opening switch 21D are switched in conjunction with one another. The contact SW1 is switched onto the a-side, the contact SW2 is opened, and the contact SW3 is switched onto the a-side. Therefore, as illustrated by the broken-line arrow of FIG. 4, the current is passed through a route of contact SW1→coil X1 of relay 22A→contact SW3→ground from the power supply B1 via the terminal T5. As a result, the current is passed through the coil X1 to operate the relay 22A. Then, the contact Y1 of the relay 22A is switched onto the a-side, and the current is passed through a route of contact Y1→motor 23→contact Y2→terminal T9→ground from the power supply B1 via the terminal T5 as illustrated by the solid-line arrow of FIG. 4. At this point, it is assumed that a direction of the current passed through the motor 23 is a "reverse direction". The current is passed through the motor 23 in the reverse direction to reversely rotate the motor 23, thereby opening the window.

Figure 5:
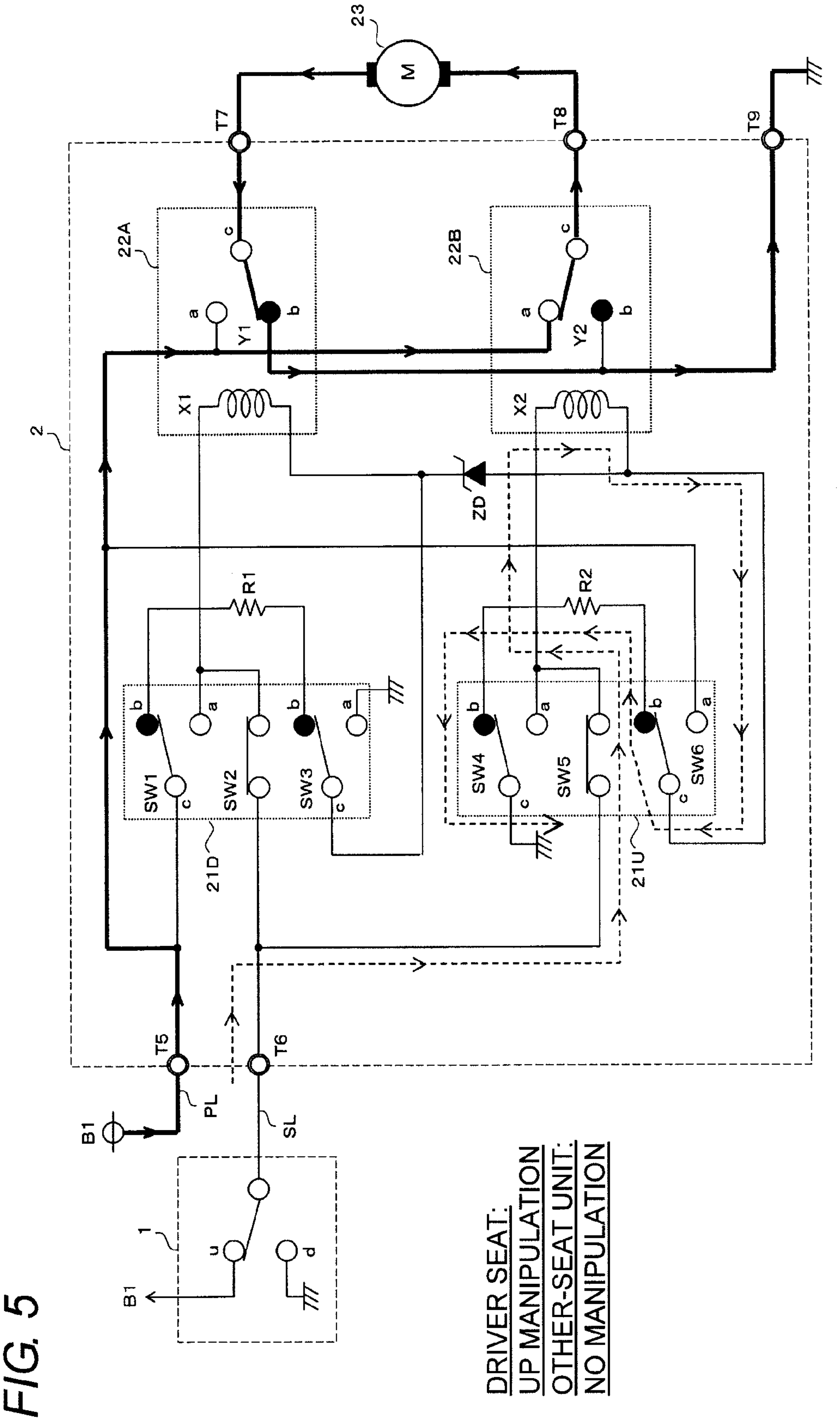
FIG. 5 is a circuit diagram illustrating the current-passing state when the window closing manipulation is performed at a driver seat.

(3) The Case in which the Manipulation is not Performed at any other Seat while the UP Manipulation is Performed at the Driver Seat (FIG. 5)

As described above, in the driver seat unit 1, when the UP manipulation is performed by the other-seat switch 12 (see FIG. 2), the terminal T2 of the driver seat unit 1 is connected to the power supply B1 to become the "H" level. Therefore, as illustrated by the broken-line arrow of FIG. 5, the current is passed through a route of contact SW5→coil X2 of relay 22B→contact SW6→resistor R2→contact SW4→ground from the power supply B1 via the driver seat unit 1 (terminal T2), the signal line SL, and the terminal T6. As a result, the current is passed through the coil X2 to operate the relay 22B. Then, the contact Y2 of the relay 22B is switched onto the a-side, and the current is passed through a route of contact Y2→motor 23→contact Y1→terminal T9→ground from the power supply B1 via the terminal T5 as illustrated by a solid-line arrow of FIG. 5. At this point, because the current is passed through the motor 23 in the forward direction, the motor 23 is normally rotated to close the window. Thus, when the UP manipulation is performed by the driver seat unit 1, the window of any other seat (in this case, passenger seat) can be closed by the remote manipulation.

Figure 6:
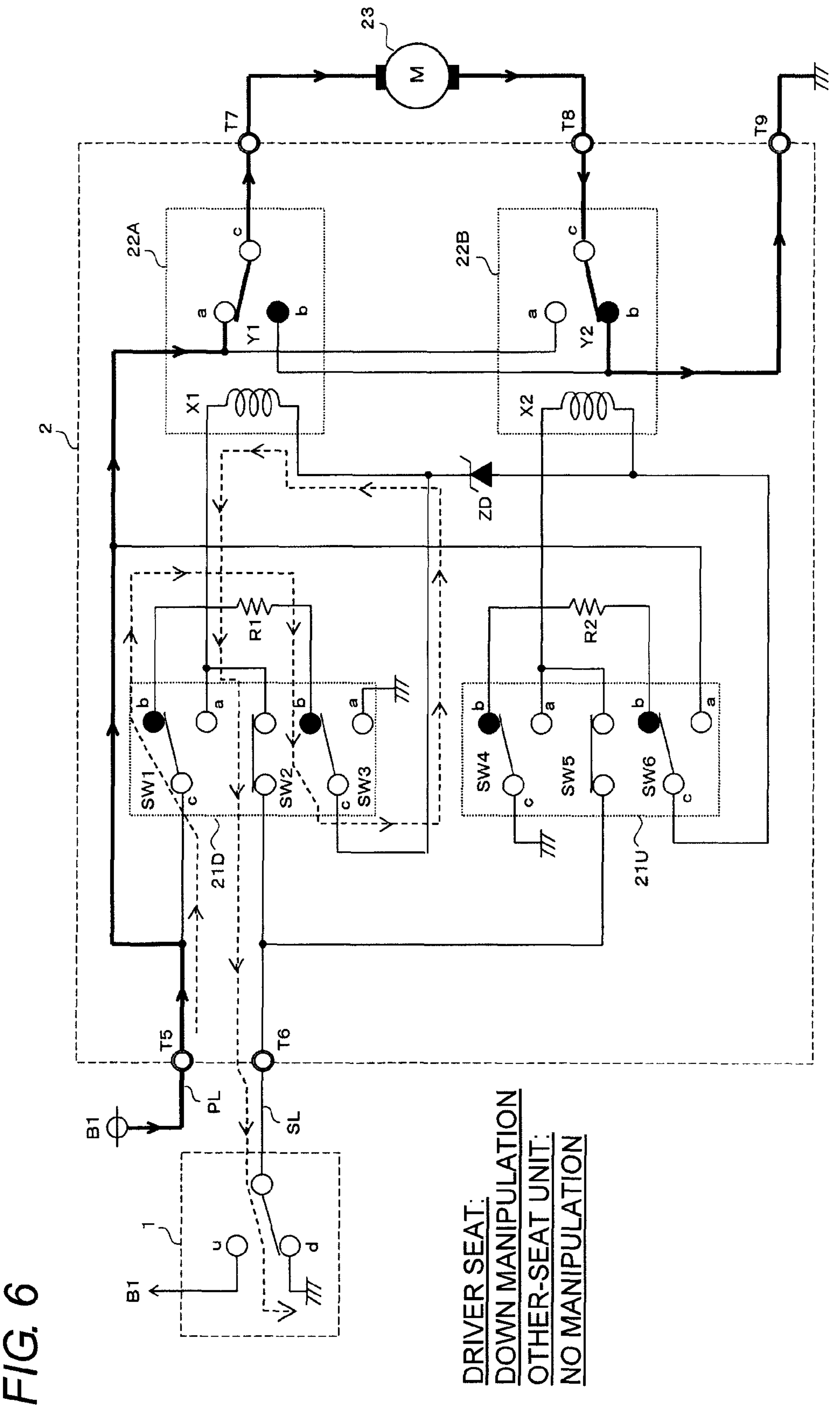
FIG. 6 is a circuit diagram illustrating the current-passing state when the window opening manipulation is performed at the driver seat.

(4) The Case in which the Manipulation is not Performed at any other Seat while the DOWN Manipulation is Performed at the Driver Seat (FIG. 6)

As described above, in the driver seat unit 1, when the DOWN manipulation is performed by the other-seat switch 12 (see FIG. 2), the terminal T2 of the driver seat unit 1 is connected to the ground to become the "L" level. Therefore, as illustrated by the broken-line arrow of FIG. 6, the current is passed through a route of contact SW1→resistor R1→contact SW3→coil X1 of relay 22A→contact SW2→terminal T6→signal line SL→driver seat unit 1 (terminal T2) from the power supply B1 via the terminal T5. As a result, the current is passed through the coil X1 to operate the relay 22A. Then, the contact Y1 of the relay 22A is switched onto the a-side, and the current is passed through a route of contact Y1→motor 23→contact Y2→terminal T9→ground from the power supply B1 via the terminal T5 as illustrated by the solid-line arrow of FIG. 6. At this point, because the current is passed through the motor 23 in the reverse direction, the motor 23 is reversely rotated to open the window. Thus, when the DOWN manipulation is performed by the driver seat unit 1, the other-seat window can be opened by the remote manipulation.

Figure 7:
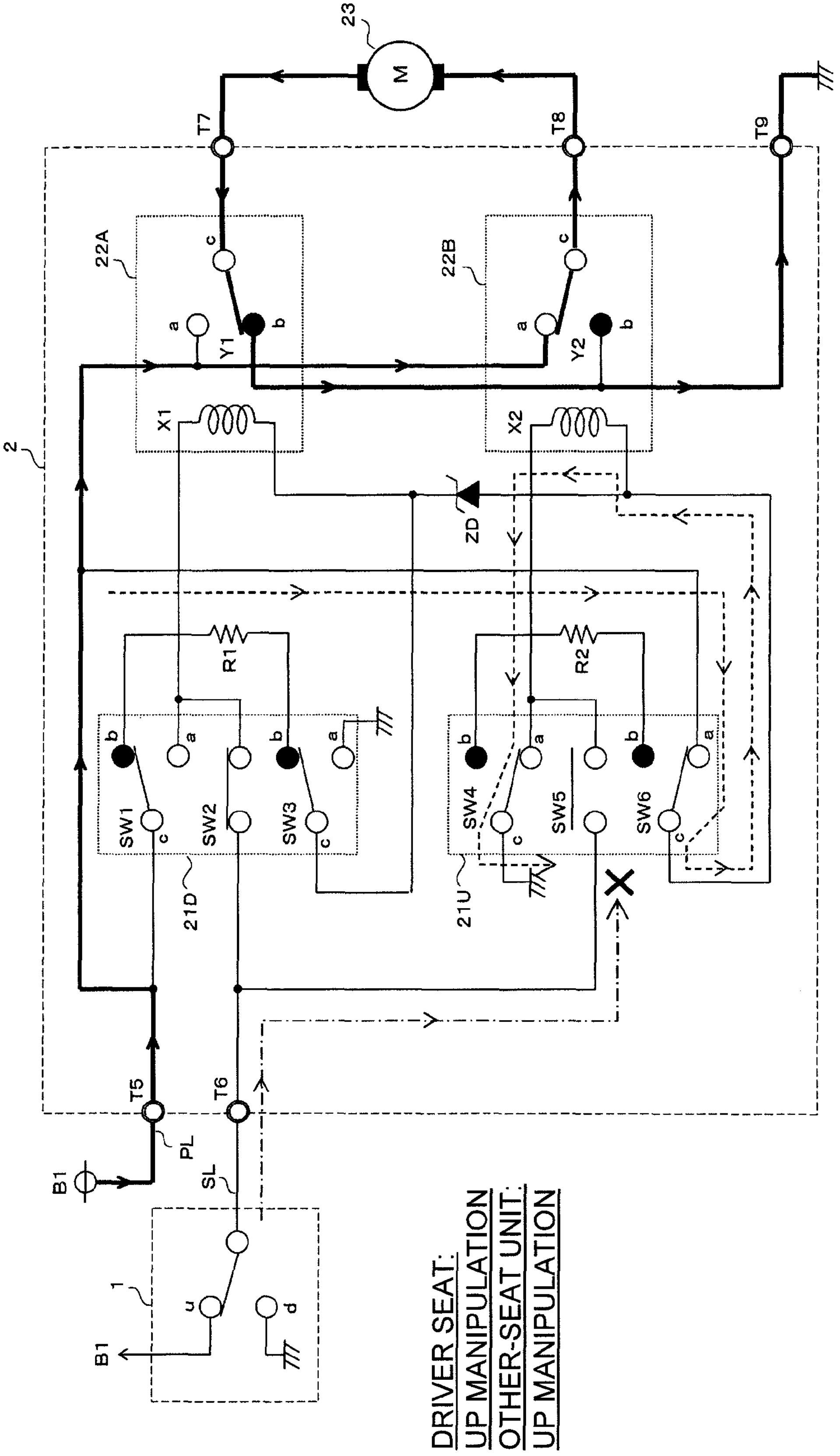
FIG. 7 is a circuit diagram illustrating the current-passing state when the window closing manipulation is performed both at the driver seat and any other seat.

(5) The Case in which the UP Manipulation is Performed at the Driver Seat while the UP Manipulation is Performed at any other Seat (FIG. 7)

As described above, in the driver seat unit 1, when the UP manipulation is performed by the other-seat switch 12 (see FIG. 2), the terminal T2 of the driver seat unit 1 is connected to the power supply B1 to become the "H" level. In the other-seat unit 2, when the window closing switch 21U is manipulated to perform the UP manipulation, the contact SW5 is opened. Because the contact SW5 is opened, the current is not passed from the driver seat unit 1 (terminal T2) via the signal line SL and the terminal T6 as illustrated by a chain-line arrow of FIG. 7. On the other hand, the contacts SW4 and SW6 are switched onto the a-side by the UP manipulation of the window closing switch 21U. Therefore, as illustrated by the broken-line arrow of FIG. 7, the current is passed through the route of contact SW6→coil X2 of relay 22B→contact SW4→ground from the power supply B1 via the terminal T5. As a result, the current is passed through the coil X2 to operate the relay 22B. Then, the contact Y2 of the relay 22B is switched onto the a-side, and the current is passed through the route of contact Y2→motor 23→contact Y1→terminal T9→ground from the power supply B1 via the terminal T5 as illustrated by a solid-line arrow of FIG. 7. At this point, because the current is passed through the motor 23 in the forward direction, the motor 23 is normally rotated to close the window. Even if the UP manipulations are simultaneously performed by the driver seat unit 1 and the other-seat unit 2, the motor 23 can normally be rotated to normally close the window.

Figure 8:
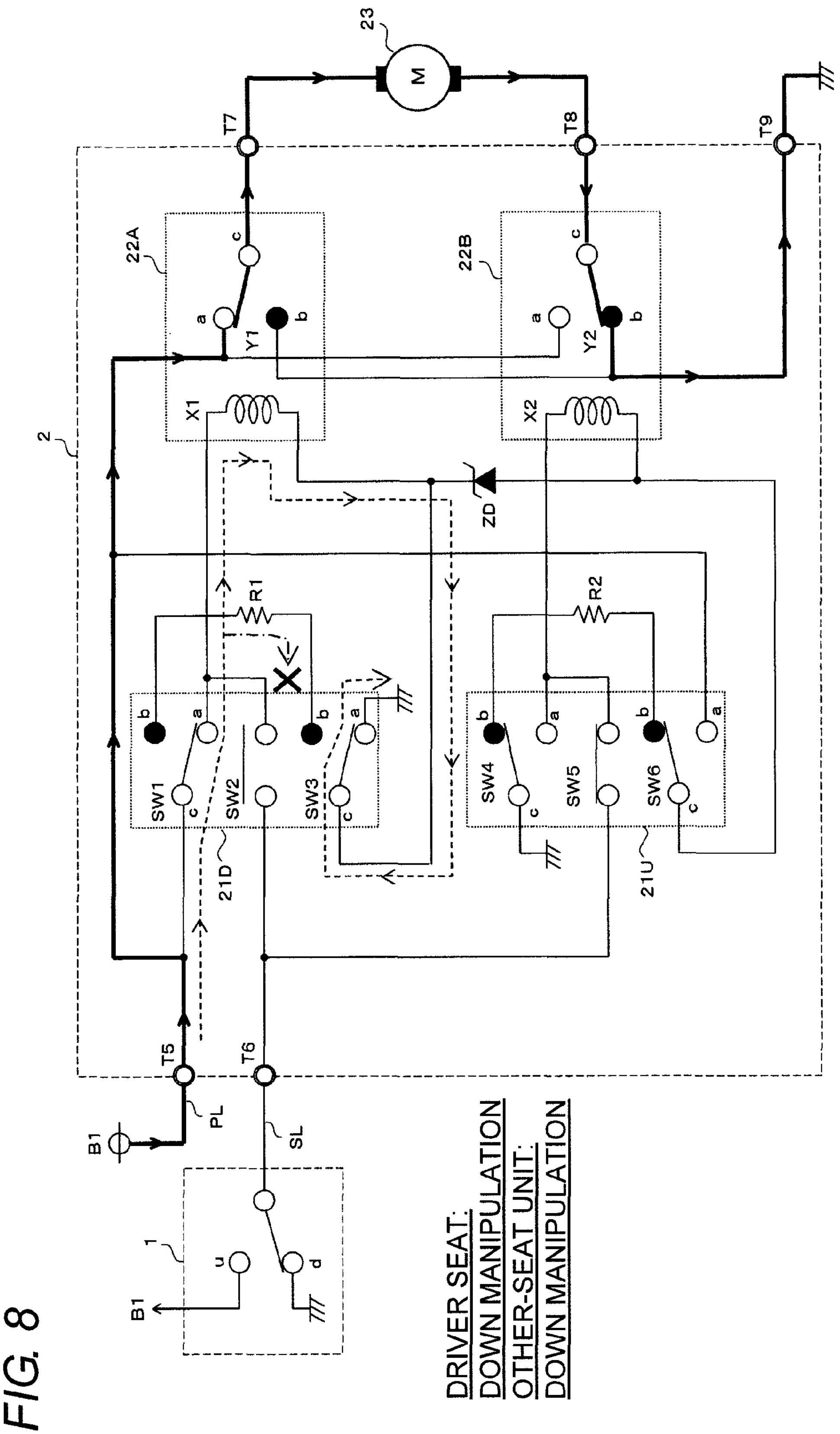
FIG. 8 is a circuit diagram illustrating the current-passing state when the window opening manipulation is performed both at the driver seat and any other seat.

(6) The Case in which the DOWN Manipulation is Performed at the Driver Seat while the DOWN Manipulation is Performed at any other Seat (FIG. 8)

As described above, in the driver seat unit 1, when the DOWN manipulation is performed by the other-seat switch 12 (see FIG. 2), the terminal T2 of the driver seat unit 1 is connected to the ground to become the "L" level. In the other-seat unit 2, when the window opening switch 21D is manipulated to perform the DOWN manipulation, the contact SW2 is opened. Because the contact SW2 is opened, the current is not passed onto the side of the driver seat unit 1 from the power supply B1 via the terminal T5 and the contact SW1 as illustrated by the chain-line arrow of FIG. 8. On the other hand, the contacts SW1 and SW3 are switched onto the a-side by the DOWN manipulation of the window opening switch 21D. Therefore, as illustrated by the broken-line arrow of FIG. 8, the current is passed through the route of contact SW1→coil X1 of relay 22A→contact SW3→ground from the power supply B1 via the terminal T5. As a result, the current is passed through the coil X1 to operate the relay 22A. Then, the contact Y1 of the relay 22A is switched onto the a-side, and the current is passed through a route of contact Y1→motor 23→contact Y2→terminal T9→ground from the power supply B1 via the terminal T5 as illustrated by the solid-line arrow of FIG. 8. At this point, because the current is passed through the motor 23 in the reverse direction, the motor 23 is reversely rotated to open the window. Even if the DOWN manipulations are simultaneously performed by the driver seat unit 1 and the other-seat unit 2, the motor 23 can reversely be rotated to normally open the window.

Figure 9:
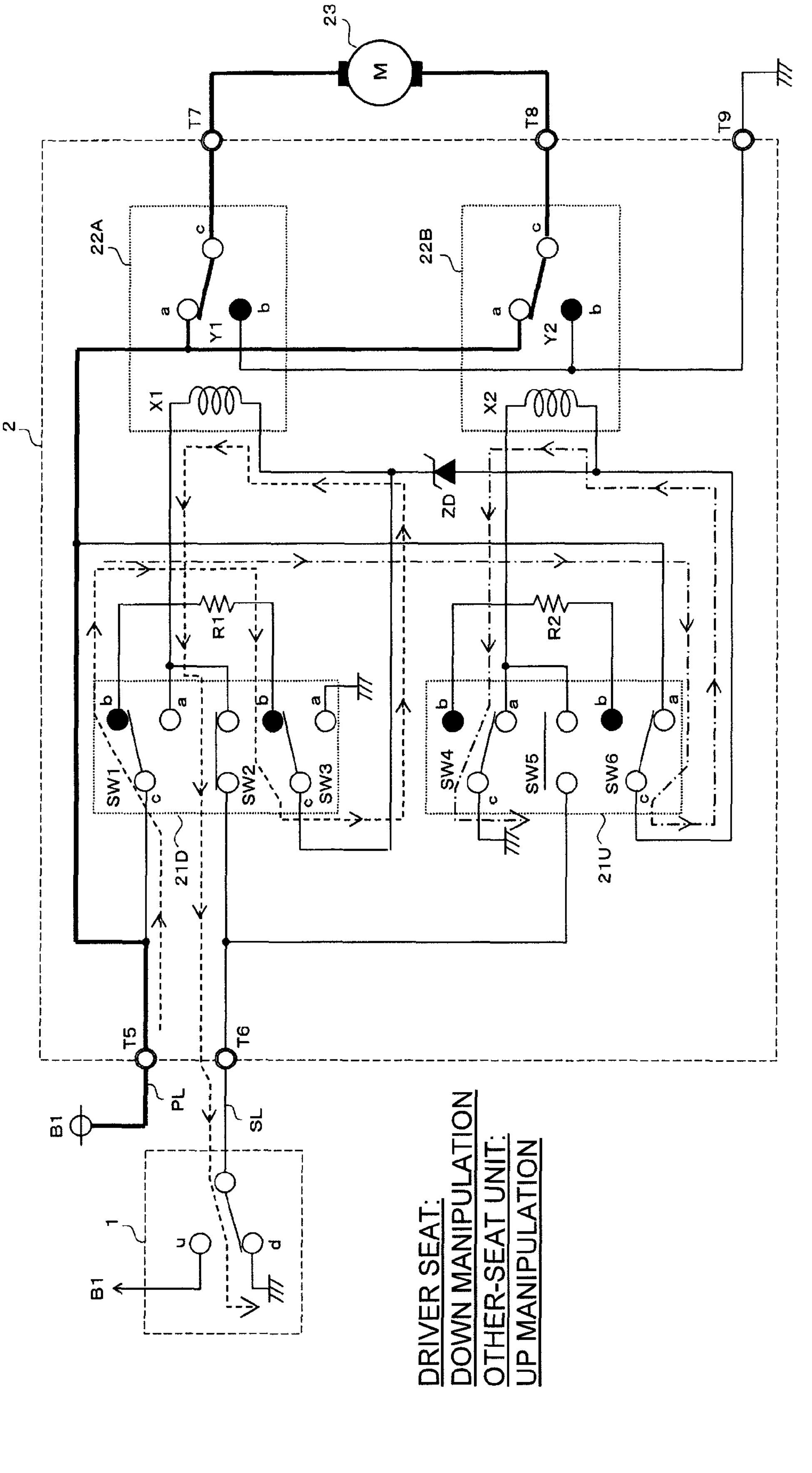
FIG. 9 is a circuit diagram illustrating the current-passing state when the window opening manipulation is performed at the driver seat while the window closing manipulation is performed at any other seat.

(7) The Case in which the DOWN Manipulation is Performed at the Driver Seat while the UP Manipulation is Performed at any other Seat (FIG. 9)

As described above, in the driver seat unit 1, when the DOWN manipulation is performed by the other-seat switch 12 (see FIG. 2), the terminal T2 of the driver seat unit 1 is connected to the ground to become the "L" level. Therefore, as illustrated by the broken-line arrow of FIG. 9, the current is passed through the route of contact SW1→resistor R1→contact SW3→coil X1 of relay 22A→contact SW2→terminal T6→signal line SL→driver seat unit 1 (terminal T2) from the power supply B1 via the terminal T5. As a result, the current is passed through the coil X1 to operate the relay 22A, thereby switching the contact Y1 onto the a-side.

On the other hand, in the other-seat unit 2, when the window closing switch 21U is manipulated to perform the UP manipulation, the contacts SW4 to SW6 of the window closing switch 21U are switched in conjunction with one another. The contact SW4 is switched onto the a-side, the contact SW5 is opened, and the contact SW6 is switched onto the a-side. Therefore, as illustrated by the chain-line arrow of FIG. 9, the current is passed through the route of contact SW6→coil X2 of relay 22B→contact SW4→ground from the power supply B1 via the terminal T5. As a result, the current is passed through the coil X2 to operate the relay 22B, thereby switching the contact Y2 onto the a-side.

As a result of switching both the contact Y1 of the relay 22A and the contact Y2 of the relay 22B onto the a-side, the current is not passed through the motor 23 because potentials at both ends of the motor 23 become identical. Accordingly, the motor 23 is not normally or reversely rotated, and the window is not opened or closed. Therefore, the rotation of the motor 23 is prohibited to prevent a malfunction, when the manipulations contradictory to each other are simultaneously performed, namely, when the DOWN manipulation is performed on the driver seat side while the UP manipulation is performed on the other-seat side.

Figure 10:
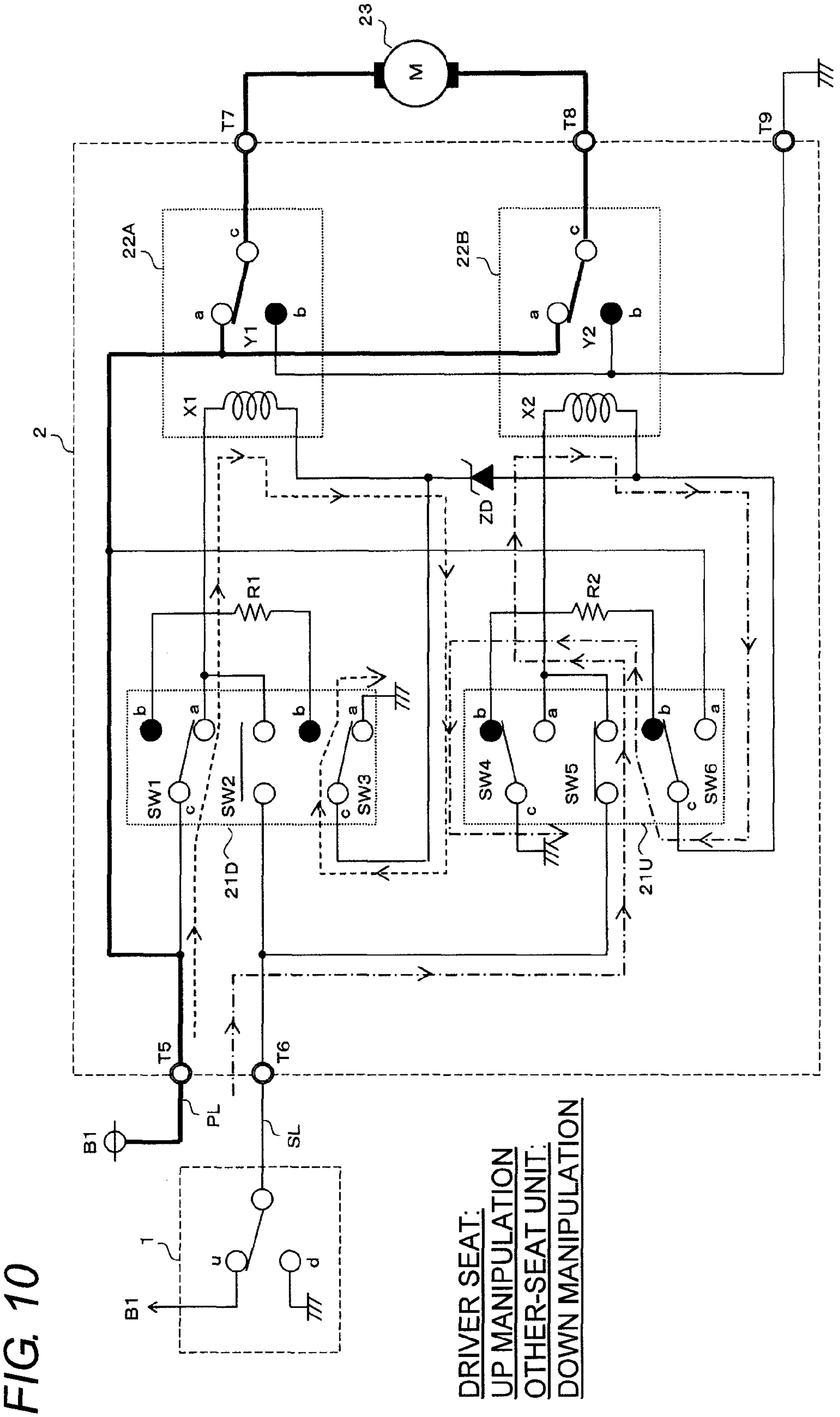
FIG. 10 is a circuit diagram illustrating the current-passing state when the window closing manipulation is performed at the driver seat while the window opening manipulation is performed at any other seat.

(8) The Case in which the UP Manipulation is Performed at the Driver Seat while the DOWN Manipulation is Performed at any other Seat (FIG. 10)

As described above, in the driver seat unit 1, when the UP manipulation is performed by the other-seat switch 12 (see FIG. 2), the terminal T2 of the driver seat unit 1 is connected to the power supply B1 to become the "H" level. Therefore, as illustrated by the chain-line arrow of FIG. 10, the current is passed through the route of contact SW5→coil X2 of relay 22B→contact SW6→resistor R2→contact SW4→ground from the power supply B1 via the driver seat unit 1 (terminal T2), the signal line SL, and the terminal T6. As a result, the current is passed through the coil X2 to operate the relay 22B, thereby switching the contact Y2 onto the a-side.

On the other hand, in the other-seat unit 2, when the window opening switch 21D is manipulated to perform the DOWN manipulation, the contacts SW1 to SW3 of the window opening switch 21D are switched in conjunction with one another. The contact SW1 is switched onto the a-side, the contact SW2 is opened, and the contact SW3 is switched onto the a-side. Therefore, as illustrated by the broken-line arrow of FIG. 10, the current is passed through the route of contact SW1→coil X1 of relay 22A→contact SW3→ground from the power supply B1 via the terminal T5. As a result, the current is passed through the coil X1 to operate the relay 22A, thereby switching the contact Y1 onto the a-side.

As a result of switching both the contact Y1 of the relay 22A and the contact Y2 of the relay 22B onto the a-side, the current is not passed through the motor 23 because potentials at both ends of the motor 23 become identical. Accordingly, the motor 23 is not normally or reversely rotated, and the window is not opened or closed. Therefore, the rotation of the motor 23 is prohibited to prevent the malfunction, when the manipulations contradictory to each other are simultaneously performed, namely, when the UP manipulation is performed on the driver seat side while the DOWN manipulation is performed on the other-seat side.

According to the first embodiment, because the driver seat unit 1 and the other-seat unit 2 are connected by the single signal line SL, the necessity of the thick wire for the large current is eliminated between the driver seat unit 1 and the other-seat unit 2, and the number of lines can also be decreased. The direction of the current passed through the motor 23 can be switched using the contacts SW1 to SW6 of the window opening switch 21D and the window closing switch 21U. Therefore, it is not necessary to provide the current-direction detection circuit in which the expensive photo coupler is used like Japanese Unexamined Patent Publication No. 8-4417, and the window opening and closing control device can simply be made at low cost.

The contacts SW1 to SW3 of the window opening switch 21D are configured to be simultaneously switched by the DOWN manipulation of the window opening switch 21D, and the contacts SW4 to SW6 of the window closing switch 21U are configured to be simultaneously switched by the UP manipulation of the window closing switch 21U, so that the direction of the current passed through the motor 23 can be controlled by the simple configuration in which only two switches, each of which has three contacts, are provided.

As can be seen from FIGS. 1 and 2, because the power-supply relay 6 is controlled by the driver seat unit 1, the power-supply relay 6 can be turned off by issuing a command signal from the controller 7 to the driver seat unit 1. Therefore, the supply of the electric power to the other-seat unit 2 can be cut off in predetermined timing to prohibit the other-seat window to being opened and closed.

Circuit requirements attributed to the operating voltages at the relays 22A and 22B will be described below. The operating voltage is a voltage necessary to operate (turn on) the relay to switch the contact, and the operating voltage is applied to the coil. The broken-line arrow of FIG. 11 indicates a route of the current passed through the other-seat unit 2 while switches of both the driver seat unit 1 and the other-seat unit 2 are not manipulated (hereinafter referred to as a “steady state”). At this point, the current is passed through a route of contact SW1→resistor R1→contact SW3→coil X1 of relay 22A→contact SW2→contact SW5→coil X2 of relay 22B→contact SW6→resistor R2→contact SW4→ground from the power supply B1 via the terminal T5. As a result, the currents are passed through the coils X1 and X2 of the relays 22A and 22B even in the state in which the switch manipulation is not performed. Accordingly, it is necessary that the relays 22A and 22B be not operated by the currents.

Figure 11:
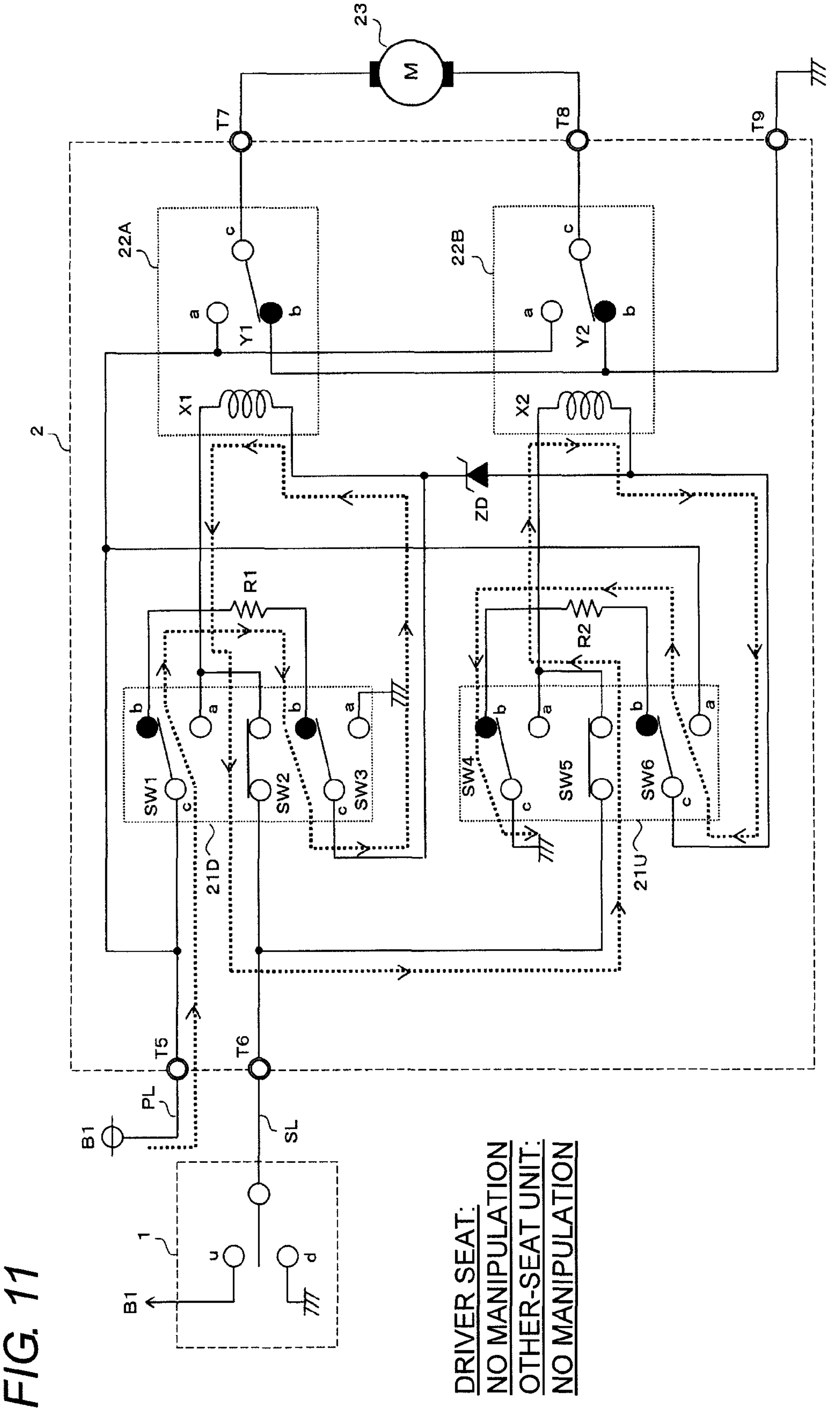
FIG. 11 is a circuit diagram illustrating a current route when all switches are not manipulated.
Figure 12:
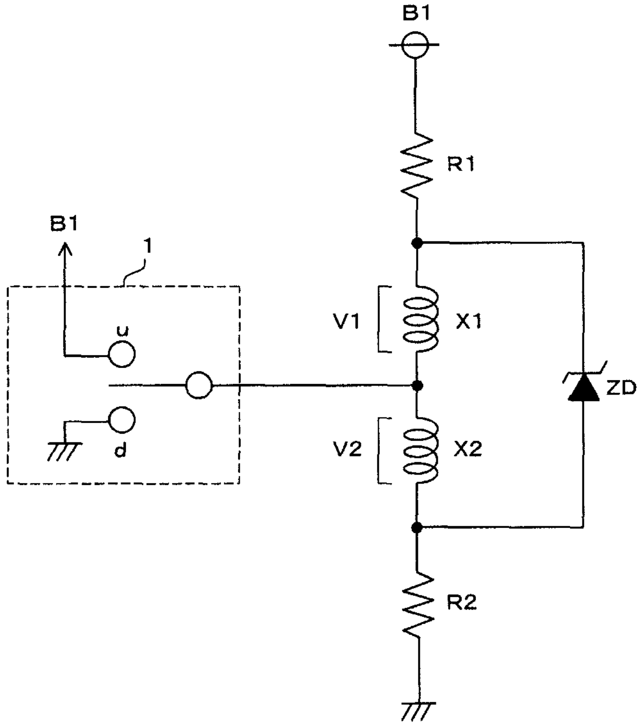
FIG. 12 illustrates part of the circuit of FIG. 11 as an equivalent circuit.

FIG. 12 illustrates the coils X1 and X2 and the resistors R1 and R2 as an equivalent circuit. In order not to operate the relays 22A and 22B by the currents of FIG. 11, voltages V1 and V2 applied to both ends of each of the coils X1 and X2 may be smaller than the operating voltages of the relays 22A and 22B in the steady state. Therefore, resistance values of the resistors R1 and R2 and a voltage value of the constant voltage diode ZD are properly selected to divide the power supply voltage B1. Accordingly, the voltages V1 and V2 applied to the coils X1 and X2 are smaller than the operating voltages of the relays 22A and 22B, which allows the malfunctions of the relays 22A and 22B to be prevented.

Second Embodiment

Figure 13:
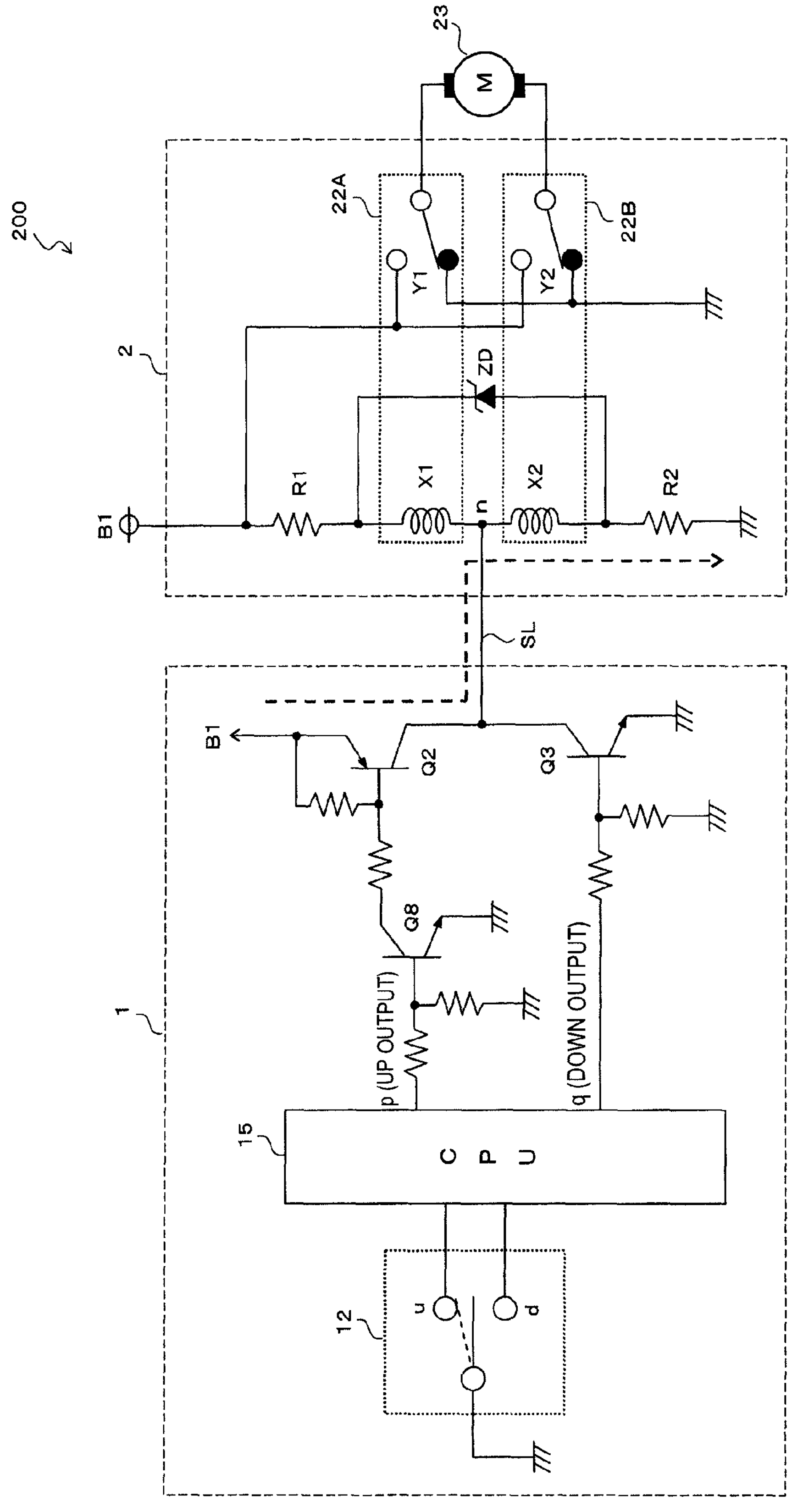
FIG. 13 is a circuit diagram illustrating a main part of a vehicle window opening and closing control device according to a second embodiment.

FIG. 13 illustrates a window opening and closing control device 200 according to a second embodiment of the invention. Only the configurations of main parts of the driver seat unit 1 and the other-seat unit 2 are illustrated in FIG. 13.

In the driver seat unit 1, the emitter of the transistor Q2 is connected to the power supply B1, and the emitter of the transistor Q3 is connected to the ground. The collectors of the transistors Q2 and Q3 are commonly connected, and the connection point of the transistors Q2 and Q3 is connected to the signal line SL.

A transistor Q8 is provided in a preceding stage of the transistor Q2. The base of the transistor Q8 is connected to a port p of the CPU 15 via a resistor. The collector of the transistor Q8 is connected to the base of the transistor Q2 via a resistor. The emitter of the transistor Q8 is connected to the ground. The base of the transistor Q3 is connected to a port q of the CPU 15 via a resistor.

When the other-seat switch 12 is manipulated onto the u-side to perform the UP manipulation, an UP output is output from the port p of the CPU 15 to the transistor Q8. When the other-seat switch 12 is manipulated onto the d-side to perform the DOWN manipulation, a DOWN output is output from the port q of the CPU 15 to the transistor Q3. The contacts SW1 to SW 6 of the other-seat unit 2 are removed in FIG. 13, and the coils X1 and X2 and the resistors R1 and R2 are illustrated using the equivalent circuit of FIG. 12.

The circuit requirements attributed to a recovery voltage of the relay is considered in the second embodiment. The recovery voltage is a voltage necessary to disable (turn off) the relay to return the contact, and the recovery voltage is applied to the coil. The circuit requirements will be described below by taking the case of FIG. 5 as an example.

In the state of FIG. 5, the UP manipulation is performed by the driver seat unit 1, and the current is passed through the coil X2 of the relay 22B in the direction illustrated by the broken-line arrow of FIG. 5. At this point, when the UP manipulation is released by the driver seat unit 1, the circuit returns to the steady state, and the current illustrated by the broken-line arrow is not passed. Instead, the current illustrated by the broken-line arrow of FIG. 11 is passed. At this point, the current direction of the coil X2 in FIG. 5 is identical to the current direction of the coil X2 in FIG. 11.

That is, even if the UP manipulation is released by the driver seat unit 1, the current is passed through the coil X2 in the same direction as before the release. Because the recovery voltage is smaller than the operating voltage by a given value or more due to a hysteresis property of the relay, sometimes the voltage at both ends of the coil X2 becomes larger than the recovery voltage when the current is passed through the route of FIG. 11. The relay 22B is not turned off, and the contact Y2 is not returned onto the b-side. Therefore, the current is continuously passed through the motor 23, and the motor 23 cannot be stopped.

In the case that the UP manipulation is released after the UP manipulation is performed by the other-seat unit 2, as can be seen from the comparison of FIGS. 3 and 11, the direction of the current passed through the coil X2 is reversed before and after the UP manipulation is released. Accordingly, in releasing the UP manipulation, because the coli X2 is demagnetized by the reverse current to turn off the relay 22B, the above trouble is not generated.

As to a countermeasure against the above trouble, in the second embodiment, a pulse signal is output from the CPU 15 of the driver seat unit 1 in order to forcedly turn off the relay 22B after the UP manipulation is released by the driver seat unit 1. This will be described with reference to a timing chart of FIG. 14.

Figures 14A, 14B, 14C, 14D:
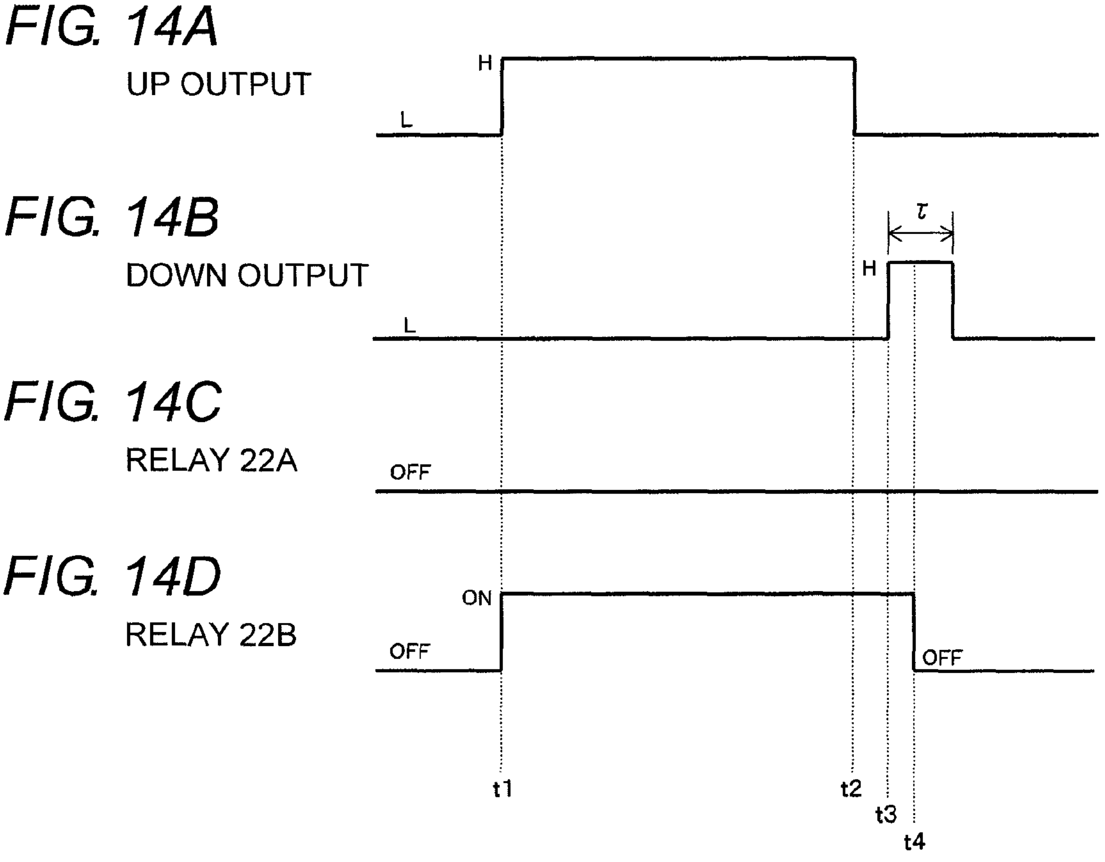
FIG. 14 is a timing chart illustrating an operation of the vehicle window opening and closing control device of the second embodiment.

In FIG. 14, 14A illustrates the UP output that is output from the CPU 15 when the UP manipulation is performed by the driver seat unit 1, 14B illustrates the DOWN output that is output from the CPU 15 when the DOWN manipulation is performed by the driver seat unit 1, 14C illustrates the on-state and the off-state of the relay 22A, and 14D illustrates the on-state and the off-state of the relay 22B.

At a time t1, when the UP manipulation is performed by the driver seat unit 1 to switch the other-seat switch 12 of FIG. 13 onto the u-side, the CPU 15 outputs the UP output having the “H” level to the port p as illustrated in the FIG. 14A. The UP output puts the transistor Q8 into the on-state and puts the transistor Q2 into the on-state. Therefore, the current illustrated by the broken-line arrow is passed through the coil X2 of the relay 22B from the power supply B1 via the transistor Q2, and the relay 22B is turned on as illustrated in the FIG. 14D. On the other hand, the relay 22A remains turned off as illustrated in the FIG. 14C because the current is not passed through the coil X1.

At a time t2, when the UP manipulation is released by the driver seat unit 1 to return the other-seat switch 12 of FIG. 13 to the original state, the UP output from the CPU 15 becomes the “L” level. Therefore, because the transistors Q8 and Q2 are put into the off-state, the current illustrated by the broken-line arrow is not passed. Similarly to the case of FIG. 11, the current is passed through the route of power supply B1→resistor R1→coil X1→coil X2→resistor R2→ground.

At a time t3, the CPU 15 outputs the DOWN output having the “H” level to the port q as illustrated in the FIG. 14B. The DOWN output is a short pulse signal having a duration $\tau$. The duration $\tau$ is selected so as to be lower than the operation time (the time until the contact is switched) of the relay 22A and so as to be not lower than the recovery time (the time until the contact returns to the original state) of the relay 22B.

The transistor Q3 becomes the on-state by the pulse signal (DOWN output). Therefore, although the current is passed through the coil X1 of the relay 22A via transistor Q3 for a moment, the relay 22A is not operated because the duration τ of the pulse signal is lower than the operation time of the relay 22A. On the other hand, when the transistor Q3 becomes the on-state, one end (n point) of the coil X2 is connected to the ground via transistor Q3. Therefore, the current passed from the power supply B1 via the resistor R1 and the coil X1 is passed from the transistor Q3 to the ground, but the current is not passed through the coil X2. Because the duration τ of the pulse signal is not lower than the recovery time of the relay 22B, the current is not passed through the coil X2 during the duration τ of the pulse signal, whereby the relay 22B is turned off (returns) at a time t4 as illustrated in the FIG. 14D.

In the window opening and closing control device 200 of the second embodiment, after the UP manipulation is released by the driver seat unit 1, the CPU 15 outputs the pulse signal having the duration not lower than the recovery time of the relay 22B, and the relay 22B is forcedly turned off based on the pulse signal. Therefore, after the UP manipulation is released, the relay 22B can securely be turned off without the influence of the hysteresis between the operating voltage and the recovery voltage of the relay. Accordingly, the malfunction, in which the motor 23 is continuously rotated although the UP manipulation is released, is prevented.

In the second embodiment, by way of example, the relay 22B is turned off by the pulse signal when the UP manipulation is released. Based on the similar principle, the relay 22A can be turned off by the pulse signal when the DOWN manipulation is released. In this case, in releasing the DOWN manipulation, the pulse signal (UP output) is output to the port p of the CPU 15 to put the transistors Q8 and Q2 into the on-state, whereby the current is not passed through the coil X1. The duration τ of the pulse signal is selected so as to be lower than the operation time of the relay 22B and so as to be not lower than the recovery time of the relay 22A.

Third Embodiment

Figure 15:
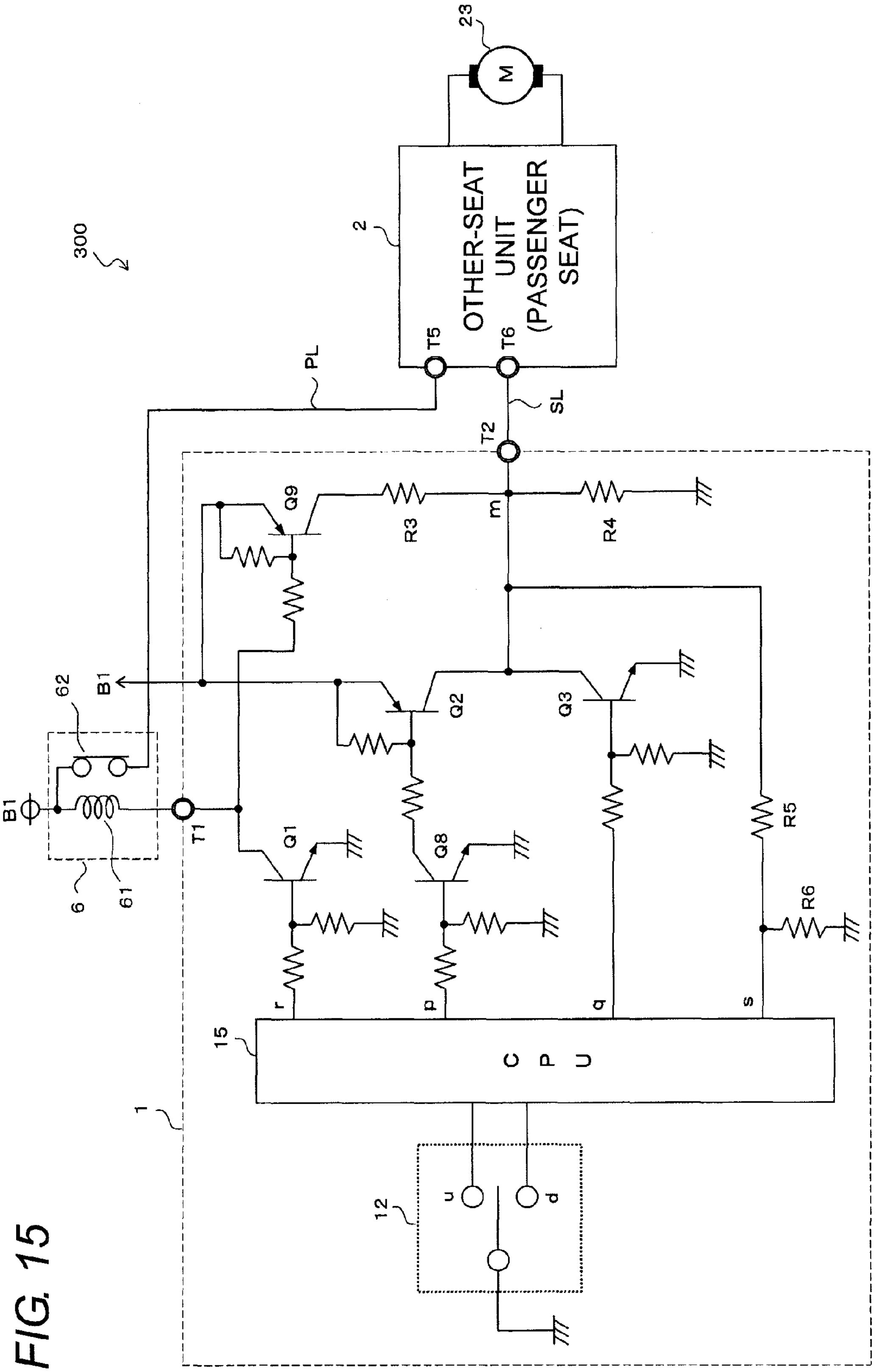
FIG. 15 is a circuit diagram illustrating a main part of a vehicle window opening and closing control device according to a third embodiment.

FIG. 15 illustrates a window opening and closing control device 300 according to a third embodiment of the invention. The window opening and closing control device 300 of the third embodiment has a fail-safe function of cutting off the power supply during generation of a short-circuit accident, and the fail-safe function is not mistakenly performed in the normal state.

In the driver seat unit 1, the base of the transistor Q1 is connected to a port r of the CPU 15 via a resistor. A collector of the transistor Q1 is connected to one end of a coil 61 of the power-supply relay 6. The other end of the coil 61 is connected to the power supply B1 (power supply 5 of FIG. 1). An emitter of the transistor Q1 is connected to the ground.

The emitter of the transistor Q2 is connected to the power supply B1, and the emitter of the transistor Q3 is connected to the ground. The collectors of the transistors Q2 and Q3 are commonly connected, and a connection point of the transistors Q2 and Q3 is connected to the signal line SL via the terminal T2. The signal line SL is connected to the terminal T6 of the other-seat unit 2. The terminal T5 of the other-seat unit 2 is connected to the contact 62 of the power-supply relay 6 via the power-supply line PL.

The transistor Q8 is provided in the preceding stage of the transistor Q2. The base of the transistor Q8 is connected to the port p of the CPU 15 via the resistor. The collector of the transistor Q8 is connected to the base of the transistor Q2 via the resistor. The emitter of the transistor Q8 is connected to the ground. The base of the transistor Q3 is connected to the port q of the CPU 15 via the resistor. When the other-seat switch 12 is manipulated onto the u-side to perform the UP manipulation, the UP output is output from the port p of the CPU 15 to the transistor Q8. When the other-seat switch 12 is manipulated onto the d-side to perform the DOWN manipulation, the DOWN output is output from the port q of the CPU 15 to the transistor Q3.

An emitter of a transistor Q9 is connected to the power supply B1. The base of the transistor Q9 is connected to the collector of the transistor Q1 via a resistor. A pull-up resistor R3 and a pull-down resistor R4 are connected in series between the collector of the transistor Q9 and the ground. A connection point m of the resistors R3 and R4 is connected to the signal line SL via the terminal T2. The connection point m is also connected to a port s of the CPU 15 via resistors R5 and R6.

The fail-safe function of the circuit of FIG. 15 will be described below. The signal having the "H" level is output from a port r of the CPU 15 in the normal state in which the short circuit is not generated in the signal line SL. Because the transistor Q1 becomes the on-state to pass the current through the coil 61 of the power-supply relay 6, the contact 62 is closed as illustrated in FIG. 15, and the power supply voltage is supplied from the power supply B1 to the other-seat unit 2 via the contact 62 and the power-supply line PL.

The transistor Q1 is turned on, and therefore the transistor Q9 also becomes the on-state. As a result, the voltage at the power supply B1 is divided by the pull-up resistor R3 and the pull-down resistor R4, and the divided voltage is applied to the connection point m. When the pull-up resistor R3 and the pull-down resistor R4 are identical to each other in the resistance value, the potential at the connection point m becomes a half (hereinafter referred to as an "intermediate potential") of the potential at the power supply voltage. The CPU 15 monitors the potential at the connection point m based on the signal input to the port s, and the CPU 15 determines that the short circuit is not generated in the signal line SL when the potential at the connection point m falls within a reference range centered around the intermediate potential.

When a core wire of the signal line SL comes into contact with a metallic part of the vehicle while the DOWN output is not output from the port q of the CPU 15, a short circuit onto the ground side (hereinafter referred to as a "ground fault") is generated in the signal line SL. At this point, the potential at the terminal T2 connected to the signal line SL, namely the potential at the connection point m becomes substantial zero. As a result, the CPU 15 determines that the ground fault is generated in the signal line SL. The CPU 15 switches the output of the port r to the "L" level. The transistor Q1 becomes the off-state, and the current is not passed through the coil 61 of the power-supply relay 6. Therefore, the contact 62 is opened to cut off the supply of the electric power to the other-seat unit 2 from the power supply B1. The malfunction of the motor 23 can be prevented by the fail-safe function during the generation of the ground fault.

On the other hand, when the core wire of the signal line SL comes into contact with the power-supply line PL while the UP output is not output from the port p of the CPU 15, a short circuit onto the power supply side (hereinafter referred to as a "power-supply short circuit") is generated in the signal line SL. At this point, the potential at the terminal T2 connected to the signal line SL, namely the potential at the connection point m substantially becomes the potential at the power supply B1. As a result, the CPU 15 determines that the power-supply short circuit is generated in the signal line SL. The CPU 15 switches the output of the port r to the "L" level. The transistor Q1 becomes the off-state, and the current is not passed through the coil 61 of the power-supply relay 6. Therefore, the contact 62 is opened to cut off the supply of the electric power to the other-seat unit 2 from the power supply B1. The malfunction of the motor 23 can be prevented by the fail-safe function during the generation of the power-supply short circuit.

In the normal state, because the potential at the connection point m is maintained at the intermediate potential by the pull-up resistor R3 and the pull-down resistor R4, the potential at the connection point m falls within the reference range even if the potential at the signal line SL fluctuates slightly due to the switch manipulation in the other-seat unit 2 or other factors. In this case, because the CPU 15 does not determine that the short circuit is generated, the state in which the fail-safe function is carelessly performed to stop the motor 23 can be avoided.

Various embodiments besides the above embodiments can be adopted in the invention. For example, in the first to third embodiments, all the other-seat windows can be opened and closed by the remote manipulation of the switch at the driver seat. Alternatively, only a specific other-seat window may be opened and closed. The number of other-seat units is not limited to three as illustrated in the embodiments, but any number of other-seat units may be provided according to the number of other seats.

In the circuit of FIG. 13, the pulse signal is output from the port q for DOWN output in order to turn off the relay 22B. Alternatively, the pulse signal may be output from a dedicated port (not illustrated).

In the circuit of FIG. 15, by way of example, the pull-up resistor R3 and the pull-down resistor R4 are identical to each other in the resistance value. However, it is not always necessary that the pull-up resistor R3 and the pull-down resistor R4 be identical to each other in the resistance value.

In the circuits of FIGS. 2, 13, and 15, the usual transistor is used as the semiconductor switching element. Alternatively, a field effect transistor (FET) or the like may be used instead of the usual transistor.

What is claimed is:

1. A vehicle window opening and closing control device comprising: a driver seat unit that controls opening and closing of a window based on a manipulation of a switch provided in a driver seat of a vehicle; and an other-seat unit that controls the opening and closing of the window based on a manipulation of a switch provided in any other seat except the driver seat, wherein the driver seat unit includes a driver seat switch that opens and closes the window of the driver seat and an other-seat switch that opens and closes the window of any other seat, the other-seat unit includes a switch that opens and closes the window of the any other seat, the driver seat unit and the other-seat unit are connected by a single signal line, the other-seat unit includes a first relay and a second relay, which switch a direction of a current passed through a window opening and closing motor, the switch of the other-seat unit includes a window opening switch that is manipulated in opening the window and a window closing switch that is manipulated in closing the window, the current is passed through a coil of the second relay from a power supply via the window closing switch and a forward current is passed through the motor to normally rotate the motor by switching a contact of the second relay when the window closing switch is manipulated by the other-seat unit, the current is passed through a coil of the first relay from the power supply via the window opening switch and a reverse current is passed through the motor to reversely rotate the motor by switching a contact of the first relay when the window opening switch is manipulated by the other-seat unit, the current is passed through a route to the coil of the second relay from the power supply via the driver seat unit, the signal line, and the window closing switch and the forward current is passed through the motor to normally rotate the motor by switching the contact of the second relay when the other-seat switch is manipulated onto a window closing side by the driver seat unit, and the current is passed through a route to the driver seat unit from the power supply via the window opening switch, the coil of the first relay, and the signal line and the reverse current is passed through the motor to reversely rotate the motor by switching the contact of the first relay when the other-seat switch is manipulated onto a window opening side by the driver seat unit.

2. The vehicle window opening and closing control device according to claim 1, wherein, when the other-seat switch is manipulated onto the window closing side by the driver seat unit while the window closing switch is manipulated by the other-seat unit, the current-passing route to the coil of the second relay from the driver seat unit via the signal line is cut off by the window closing switch, the current is passed through the coil of the second relay from the power supply via the window closing switch, and the forward current is passed through the motor to normally rotate the motor by switching the contact of the second relay.

3. The vehicle window opening and closing control device according to claim 1, wherein, when the other-seat switch is manipulated onto the window opening side by the driver seat unit while the window opening switch is manipulated by the other-seat unit, the current-passing route to the driver seat unit from the power supply via the signal line is cut off by the window opening switch, the current is passed through the coil of the first relay from the power supply via the window opening switch, and the reverse current is passed through the motor to reversely rotate the motor by switching the contact of the first relay.

4. The vehicle window opening and closing control device according to claim 1, wherein, when the other-seat switch is manipulated onto the window opening side by the driver seat unit while the window closing switch is manipulated by the other-seat unit, the current is passed through the route to the driver seat unit from the power supply via the window opening switch, the coil of the first relay, and the signal line to switch the contact of the first relay, the current is passed through the coil of the second relay from the power supply via the window closing switch to switch the contact of the second relay, and both ends of the motor are maintained at an identical potential by switching each contact such that the motor is not rotated.

5. The vehicle window opening and closing control device according to claim 1, wherein, when the other-seat switch is manipulated onto the window closing side by the driver seat unit while the window opening switch is manipulated by the other-seat unit, the current is passed through the route to the coil of the second relay from the power supply via the driver seat unit, the signal line, and the window closing switch to switch the contact of the second relay, the current is passed through the coil of the first relay from the power supply via the window opening switch to switch the contact of the first relay, and both ends of the motor are maintained at an identical potential by switching each contact such that the motor is not rotated.

6. The vehicle window opening and closing control device according to claim 1, wherein the window opening switch includes a first contact that connects one end of the coil of the first relay to the power supply, a second contact that connects the signal line to one end of the coil of the first relay, and a third contact that connects the other end of the coil of the first relay to a ground, the first contact, the second contact, and the third contact are switched in conjunction with one another by the manipulation of the window opening switch, the window closing switch includes a fourth contact that connects one end of the coil of the second relay to the ground, a fifth contact that connects the signal line to one end of the coil of the second relay, and a sixth contact that connects the other end of the coil of the second relay to the power supply, and the fourth contact, the fifth contact, and the sixth contact are switched in conjunction with one another by the manipulation of the window closing switch.

7. The vehicle window opening and closing control device according to claim 1, wherein the driver seat unit includes a CPU, and the CPU outputs a pulse signal having a duration not lower than a recovery time of the first relay or the second relay after the manipulation of the other-seat switch is released, and turns off the first relay or the second relay based on the pulse signal.

8. The vehicle window opening and closing control device according to claim 1, wherein the driver seat unit includes a pull-up resistor that is provided between the signal line and the power supply, a pull-down resistor that is provided between the signal line and the ground, and a CPU, and the CPU monitors a potential at the signal line and detects a short circuit onto a ground side of the signal line or a short circuit onto a power supply side based on a fluctuation of the potential.

9. The vehicle window opening and closing control device according to claim 1, further comprising a power-supply relay that supplies and cuts off an electric power to the other-seat unit, wherein the driver seat unit puts the power-supply relay into an off state to cut off the supply of the electric power to the other-seat unit in response to an externally-input command signal.

* * * * *